United States Patent
Dogin et al.

(10) Patent No.: US 11,544,781 B2
(45) Date of Patent: Jan. 3, 2023

(54) LEVERAGING A NETWORK "POSITIVE CARD" LIST TO INFORM RISK MANAGEMENT DECISIONS

(71) Applicant: MasterCard International Incorporated, Purchase, NY (US)

(72) Inventors: Jennifer Dogin, Mamaroneck, NY (US); Richard A. Rozbicki, Danbury, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 670 days.

(21) Appl. No.: 15/853,741

(22) Filed: Dec. 23, 2017

(65) Prior Publication Data

US 2019/0197616 A1    Jun. 27, 2019

(51) Int. Cl.
    *G06Q 40/02*    (2012.01)
    *G06Q 20/10*    (2012.01)

(52) U.S. Cl.
    CPC .......... *G06Q 40/025* (2013.01); *G06Q 20/10* (2013.01)

(58) Field of Classification Search
    CPC .............. G06Q 20/4016; G06Q 20/10; G06Q 40/025
    USPC ..................................................... 705/39, 44
    See application file for complete search history.

(56) References Cited

U.S. PATENT DOCUMENTS

| | | | |
|---|---|---|---|
| 5,699,528 A | 12/1997 | Hogan | |
| 6,636,833 B1 | 10/2003 | Flitcroft et al. | |
| 7,136,835 B1 | 11/2006 | Flitcroft et al. | |
| 7,566,003 B2 * | 7/2009 | Silbernagl | G06Q 20/20 235/375 |
| 7,568,617 B2 * | 8/2009 | Silbernagl | G06Q 20/18 235/375 |
| 8,505,816 B2 * | 8/2013 | Silbernagl | G06Q 20/4037 235/382 |

(Continued)

FOREIGN PATENT DOCUMENTS

WO    WO2014027287 A1    2/2014

OTHER PUBLICATIONS

U. Demir Alan and D. Birant, "Server-Based Intelligent Public Transportation System with NFC," in IEEE Intelligent Transportation Systems Magazine, vol. 10, No. 1, pp. 30-46, Spring 2018, doi: 10.1109/MITS.2017.2776102. (Year: 2018).*

(Continued)

*Primary Examiner* — Mike Anderson
*Assistant Examiner* — John O Preston
(74) *Attorney, Agent, or Firm* — Otterstedt & Kammer PLLC

(57) ABSTRACT

A plurality of bank identification number (BIN) ranges are characterized according to credit risk. A list of the plurality of bank identification number (BIN) ranges characterized by credit risk is made available to a transit-specific payment network interface processor, which is coupled to a plurality of memory-constrained fare gates of a transit authority. The list is configured to be distributed to the memory-constrained fare gates of the transit authority. Advantageously, the list based on BIN ranges takes up less memory than a list based on individual account numbers or the like and can be maintained in memory at the memory-constrained fare gates for rapid decisioning.

8 Claims, 13 Drawing Sheets

(56) References Cited

U.S. PATENT DOCUMENTS

| | | | | |
|---|---|---|---|---|
| 8,662,390 | B2* | 3/2014 | Silbernagl | G06K 7/087 235/382 |
| 9,747,644 | B2 | 8/2017 | Cowen et al. | |
| 10,460,397 | B2 | 10/2019 | Cowen et al. | |
| 2006/0278704 | A1* | 12/2006 | Saunders | G07B 15/04 235/382 |
| 2010/0100480 | A1 | 4/2010 | Altman et al. | |
| 2011/0000962 | A1* | 1/2011 | Chan | G06Q 50/30 235/382 |
| 2011/0251952 | A1 | 10/2011 | Kelly et al. | |
| 2012/0197788 | A1 | 8/2012 | Sanghvi et al. | |
| 2013/0275307 | A1 | 10/2013 | Khan | |
| 2013/0290177 | A1 | 10/2013 | Milam et al. | |
| 2013/0311362 | A1 | 11/2013 | Milam et al. | |
| 2014/0279309 | A1* | 9/2014 | Cowen | G06Q 20/4016 705/30 |
| 2015/0012427 | A1 | 1/2015 | Phillips et al. | |
| 2015/0019439 | A1 | 1/2015 | Phillips | |
| 2015/0088745 | A1 | 3/2015 | Phillips et al. | |
| 2015/0227923 | A1 | 8/2015 | Kutsch et al. | |
| 2016/0078436 | A1 | 3/2016 | Tomasofsky et al. | |
| 2016/0078443 | A1 | 3/2016 | Tomasofsky et al. | |
| 2016/0078444 | A1 | 3/2016 | Tomasofsky et al. | |
| 2016/0092981 | A1 | 3/2016 | Ghosh | |
| 2016/0148195 | A1 | 5/2016 | Acosta | |
| 2016/0210600 | A1 | 7/2016 | Sobek | |
| 2016/0217467 | A1 | 7/2016 | Smets et al. | |
| 2016/0260084 | A1 | 9/2016 | Main et al. | |
| 2016/0307184 | A1 | 10/2016 | Peyton et al. | |
| 2016/0350849 | A1 | 12/2016 | Lynch | |
| 2017/0024720 | A1 | 1/2017 | Shah | |
| 2017/0068939 | A1 | 3/2017 | Groarke et al. | |
| 2017/0091766 | A1 | 3/2017 | Venugopalan et al. | |

OTHER PUBLICATIONS

G. Me, M. A. Strangio and A. Schuster, "Mobile Local Macropayments: Security and Prototyping," in IEEE Pervasive Computing, vol. 5, No. 4, pp. 94-100, Oct.-Dec. 2006, doi: 10.1109/MPRV. 2006.78. (Year: 2006).*

W. Ahmed et al., "Security in Next Generation Mobile Payment Systems: A Comprehensive Survey," in IEEE Access, vol. 9, pp. 115932-115950, 2021, doi: 10.1109/ACCESS.2021.3105450. (Year: 2021).*

PayPal Credit, PayPal Credit FAQs, Apply for PayPal Credit and start enjoying more time to pay, downloaded May 16, 2017 from https://www.paypalcredit.com/index.html#faqs, pp. 1-7.

Mastercard Digital Enablement Service—Ensure every transaction is secure with card tokenization—downloaded Nov. 24, 2017 from https://developer.mastercard.com/product/mdes, pp. 1-8, MasterCard International Incorporated, (c) 1994-2017.

CoreLogic, Credco, Understanding Credit & Credit Risk Scores, Plus, Helping Consumer Get the Most From Their Credit Rating, 2011, pp. 1-26.

How Credit History Impacts Your Credit Score | myFICO, downloaded Nov. 24, 2017 from https://www.myfico.com/credit-education/whats-in-your-credit-score/, pp. 1-4.

Tim Kanning, "Autoscout24 offers loans within minutes," Frankfurter Allgemeine Finances, May 16, 2017, pp. 1-3, downloaded May 16, 2017 from http://www.faz.net/aktuell/finanzen/digitalbezahlen/autoscout24undbankentreteninkonkurrenz14379894.html?GEPC=s5.

Information Security Group at the University College London, EMV tag 5F34 (Application Primary Account No. (PAN) Sequence) p. 1, downloaded Jul. 25, 2017 from https://www.emvlab.org/emvtags/show/t5F34/.

EMVCo, LLC, "EMV Payment Tokenisation—Payment Account Reference," Clarifications From Specification Bulletin No. 167, First Edition, Jan. 2016, pp. 1-3.

EMVCo, LLC, EMV®* Payment Tokenisation Specification, Technical Framework Version 1.0 Mar. 2014, pp. 1-84.

EMVCo, LLC, EMV® Payment Account Reference (PAR), EMVCo White Paper on Payment Account Reference (PAR), Version 1.0, Nov. 2016, pp. i-xiv, 1-10.

Mastercard Developers, Spend Controls, downloaded Oct. 27, 2017 from https://developer.mastercard.com/product/spend-controls, pp. 1-3.

MCommerce | Digital Payment Systems | Contactless Payments | MDES, Building the future of digital payments, downloaded Jun. 1, 2017 from https://www.mastercard.us/enus/issuers/productsandsolutions/growmanageyourbusiness/digitalcommercesolutions.html, pp. 1-4.

MasterCard International Incorporated, Mastercard Mobile Payments SDK Frequently Asked Questions MP SDK 2.1.0, pp. 1-23 (last page blank), Copyright © 2017 MasterCard, downloaded Sep. 27, 2017 https://developer.mastercard.com/media/01/af/7b30030a420fa27ee951fe555bfc/mp-sdk-2.1.0-FAQ.pdf.

Wikipedia, Apple Watch, Sep. 12, 2017, https://en.wikipedia.org/wiki/Apple_Watch, pp. 1-12.

Wikipedia, EMV, Sep. 12, 2017, https://en.wikipedia.org/wiki/EMV#Offline_data_authentication, pp. 1-21.

Wikipedia, FICO, Jun. 9, 2017, https://en.wikipedia.org/wiki/FICO, pp. 1-4.

Wikipedia, Smartwatch, Sep. 12, 2017, https://en.wikipedia.org/wiki/Smartwatch, pp. 1-11.

EMVCo, LLC, EMVCo White Paper on Payment Account Reference (PAR), Version 1.0 Nov. 2016 pp. i-xixv, 1-10.

Mastercard, Masterpass: The fast, simple, secure way to pay, Copyright © 2017 Mastercard pp. 1-15.

Total System Services, Inc., TSYS People-Centered Payments, A quick FAQ on Offline Data Authentication (ODA) and offline PIN encipherment pp. 1-2, © 2014 Total System Services, Inc.®.

Sequent Software Inc, The Sequent Blog, Secure elements vs cloud-based HCE: What is more secure for NFC mobile payments?, © 2017 Sequent Software Inc, pp. 1-3.

* cited by examiner

LEVERAGING A NETWORK "POSITIVE CARD" LIST TO INFORM RISK MANAGEMENT DECISIONS

FIELD OF THE DISCLOSURE

The present disclosure relates generally to the electronic and computer arts, and, more particularly, to apparatus and methods for secure electronic payment.

BACKGROUND OF THE DISCLOSURE

There is an interest in employing cash alternatives in a variety of environments. Such cash alternatives can include, for example, payment devices such as payment cards and the like. Indeed, devices, such as electronic devices, and particularly electronic payment devices (for example, so-called "smart cards") may be useful for a variety of payment and other applications.

Under some circumstances it is desirable that a merchant be able to accept cards and/or devices where the merchant is unable to secure an online authorization response. One non-limiting example of such circumstances is in the transit environment. For example, co-assigned U.S. Pat. No. 8,584,936 of Fiebiger et al., entitled "Techniques for Authorization of Usage of a Payment Device," indicates that it may be desirable, in a transit environment, to provide a rapid decision regarding transit access, such as in a time averaging less than 200 milliseconds (ms). This requirement generally renders online authorization impracticable. Co-assigned U.S. Pat. No. 7,657,486 of Smets et al., "Techniques for co-existence of multiple stored value applications on a single payment device managing a shared balance," notes that the 200 ms transaction time limit might be associated with a legacy public transport application while a new, more secure application might have a 500 ms limit. U.S. Pat. Nos. 8,584,936 and 7,657,486 are hereby both expressly incorporated herein by reference in their entireties for all purposes.

Efforts have been made to address the fact that it is generally not possible to send an authorization request to the card issuer and receive a response within the 500 ms limit. For example, some techniques employ a so-called whitelist, wherein the bearer of a card or other device is permitted to access a transit system or other restricted area before an authorization request response is received from an issuer, if the corresponding primary account number (PAN) is present on the so-called whitelist. Co-assigned U.S. Patent Publication 2014/0279309 of Cowen et al., TRANSACTION-HISTORY DRIVEN COUNTERFEIT FRAUD RISK MANAGEMENT SOLUTION, notes that some devices are capable of offline authentication to reduce risk, but provides, for example, techniques for constructing a so-called whitelist when devices not supporting such offline authentication are to be used in an environment wherein it would normally be expected that devices which do support offline authentication would be used. Presence on the whitelist is then used to infer authentication. U.S. Patent Publication 2014/0279309, and its corresponding issued patent U.S. Pat. No. 9,747,644, are both hereby expressly incorporated herein by reference in their entireties for all purposes.

A further trend in electronic payments is the use of so-called "smart" mobile phones or other devices in lieu of traditional payment cards. Such "smart" mobile phones or other devices may be equipped, for example, with electronic wallet software. Enhancement to security in such instances can be had using tokenization techniques such as the Mastercard Digital Enablement Service (MDES) available from Mastercard International Incorporated, Purchase, N.Y., USA. In the MDES service, the card's primary account number (PAN) is replaced with an alternate card number called a token. The tokenized card details are delivered to the mobile device through a process called digitization, and in usage, the mobile device is enabled for more secure payments.

The MDES service is a non-limiting example of tokenization. Reference is generally made to "EMV® Payment Tokenisation Specification Technical Framework," Version 1.0, March 2014, hereby expressly incorporated herein by reference in its entirety for all purposes. One or more embodiments are applicable to tokenization in accordance with the aforementioned technical framework, and to other types of tokenization.

Heretofore, construction of so-called "whitelists" has been limited to PAN-centric approaches without tokenization.

SUMMARY OF THE DISCLOSURE

Principles of the present disclosure provide techniques for leveraging a network "positive card" list to inform risk management decisions. In one aspect, an exemplary method includes characterizing a plurality of bank identification number (BIN) ranges according to credit risk; and making available, to a transit-specific payment network interface processor coupled to a plurality of memory-constrained fare gates of a transit authority, a list of the plurality of bank identification number (BIN) ranges characterized by credit risk, the list being configured to be distributed to the memory-constrained fare gates of the transit authority.

In another aspect, another exemplary method includes characterizing a plurality of token BIN ranges according to credit risk; and encoding, in at least one of: (i) corresponding tokens; and (ii) data items related to the corresponding tokens; data indicative of the credit risk.

In still another aspect, still another exemplary method includes obtaining, at a transit-specific payment network interface processor coupled to a plurality of memory-constrained fare gates of a transit authority, from another party, a list of a plurality of bank identification number (BIN) ranges characterized by credit risk; distributing the list to the memory-constrained fare gates of the transit authority; obtaining, by the transit authority, from a prospective passenger, at a given one of the memory-constrained fare gates, an indication of a bank identification number (BIN) range; and making a real-time access decision for the prospective passenger based on looking up the bank identification number (BIN) range in the list.

In a further aspect, a further exemplary method includes obtaining, by a transit authority, from a prospective passenger, an electronic token, wherein at least one of the electronic token and a data item related to the electronic token and obtained therewith, includes data, from another party, indicative of a credit risk of a token BIN range corresponding to the electronic token; and making a real-time access decision for the prospective passenger based on the data indicative of the credit risk of the token BIN range corresponding to the electronic token.

In a still further aspect, a still further exemplary method includes obtaining, at a transit-specific payment network interface processor coupled to a plurality of fare gates of a transit authority, from another party, a list of a plurality of payment account reference (PAR) numbers characterized by credit risk; obtaining, by the transit authority, from a prospective passenger, at a given one of the fare gates, an electronic token and a corresponding given one of the plurality of payment account reference (PAR) numbers, without an underlying primary account number (PAN), and wherein the electronic token and the given one of the plurality of payment account reference (PAR) numbers cannot be linked to the underlying primary account number (PAN) by the transit authority; and making a real-time access decision for the prospective passenger based on looking up the payment account reference (PAR) in the list.

Aspects of the disclosure contemplate the method(s) described herein performed by one or more entities herein, as well as facilitating of one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the disclosure or elements thereof can be implemented in the form of a computer program product including a tangible computer readable recordable storage medium with computer usable program code for performing the method steps indicated stored thereon in a non-transitory manner. Furthermore, one or more embodiments of the disclosure or elements thereof can be implemented in the form of a system (or apparatus) including a memory and at least one processor that is coupled to the memory and operative to perform exemplary method steps (e.g., transit payment network interface processor, networked with a transit host). Yet further, in another aspect, one or more embodiments of the disclosure or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein. Transmission medium(s) per se and disembodied signals per se are defined to be excluded from the claimed means.

One or more embodiments of the disclosure can provide substantial beneficial technical effects, such as enhanced security and fraud prevention while meeting transaction time requirements. These and other features and advantages of the present disclosure will become apparent from the following detailed description of illustrative embodiments thereof, which is to be read in connection with the accompanying drawings.

DETAILED DESCRIPTION OF PREFERRED EMBODIMENTS

Payment Devices and Associated Payment Processing Networks

Figure 1:
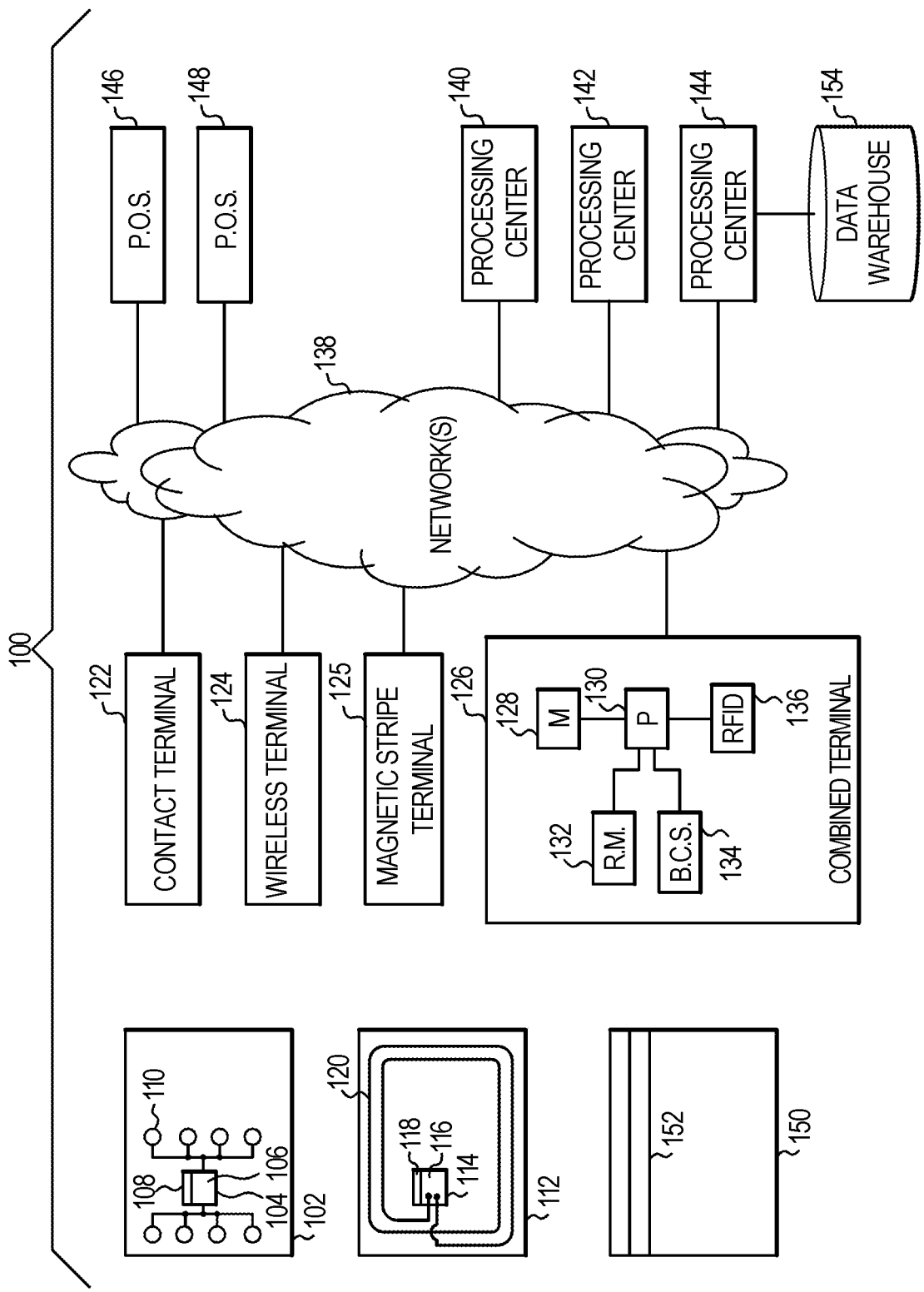
FIG. 1 shows an example of a system and various components thereof that can implement at least a portion of some techniques of the disclosure.

With regard to payment card and similar payments, attention should now be given to FIG. 1, which depicts an exemplary embodiment of a system 100, according to an aspect of the disclosure, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system 100 typically functions with other types of devices in lieu of or in addition to "smart" or "chip" cards 102, 112; for example, a conventional magnetic stripe device 150, such as a card having a magnetic stripe 152. Note, however, that tokenization is typically carried out with chip-based payment devices as opposed to magnetic stripe cards. Furthermore, an appropriately configured mobile device (e.g., "smart" cellular telephone handset, tablet, personal digital assistant (PDA), and the like) can be used to carry out contactless payments in some instances; for example, via near field communications (NFC), wherein the appropriately configured mobile device acts like a contactless card 112 (or, with an electronic wallet present, like multiple such cards).

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions of units 108, 118 can store the operating system of the cards 102, 112. The operating system loads and executes applications and provides file management or other basic card services to the applications. One operating system that can be used to implement some aspects or embodiments of the present disclosure is the MULTOS® operating system licensed by MAOSCO Limited. (MAOSCO Limited, St. Andrews House, The Links, Kelvin Close, Birchwood, Warrington, WA3 7PB, United Kingdom) Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

The skilled artisan will also be familiar with the Mastercard® Contactless specifications, available under license from Mastercard International Incorporated of Purchase, N.Y., USA (marks of Mastercard International Incorporated of Purchase, N.Y., USA).

As noted, cards 102, 112 are examples of a variety of payment devices that can be employed. The primary function of the payment devices may not be payment, for example, they may be cellular phone handsets that implement appropriate techniques. Such devices could include cards having a conventional form factor, smaller or larger cards, cards of different shape, key fobs, personal digital assistants (PDAs), appropriately configured cell phone handsets, or indeed any device with the appropriate capabilities. Another non-limiting exemplary type of device includes "POS (point-of-sale) facing" "dumb" devices, such as a watch, wherein the user interface (UI) and computational power are provided via a nearby linked mobile device, in a manner analogous to the functioning of a so-called "smartwatch" such as the Apple Watch available from Apple Inc., Cupertino, Calif., USA. In this aspect, a watch or other jewelry item has a chip inside the design somewhere and works in conjunction with a mobile device. In some cases, the cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to execute one or more steps. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any combination of devices 102, 112, 150. Some terminals can be contact terminals with plug-in contactless readers. Combined terminal 126 can include a memory 128, a processor portion 130, a reader or communications module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 2 below). More than one network could be employed to connect different elements of the system. For example, a local area network (LAN) could connect a terminal to a local server or other computer at a retail establishment, in a transit station, or the like. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone, tablet, or the like.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module, such as reader module 132, that is coupled to the processor and configured to interface with the portable apparatuses 102, 112, 150. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can optionally be provided, and can be coupled to the processor, to gather attribute data, such as a product identification, from a UPC code or RFID tag on a product to be purchased.

The above-described devices 102, 112 can be International Organization for Standardization (ISO) 7816-compliant contact cards or devices or NFC (Near Field Communications) or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device.

One or more of the processing centers 140, 142, 144 can include a database such as a data warehouse 154.

The system depicted in FIG. 1 may in general involve not only conventional transactions at "brick and mortar" merchants, but also card-not-present transactions, such as card-not-present Internet transactions or card-not-present recurring payments. In some instances, an Internet Protocol (IP) address may be captured during card-not-present Internet transactions. In exemplary card-not-present Internet transactions, an individual utilizes his or her home computer to communicate with a server of an e-commerce merchant over the Internet. The individual provides his or her PAN to the merchant's server. The merchant utilizes the PAN to initiate an authorization request, and upon receiving an authorization request response indicating approval, will complete the e-commerce transaction. In exemplary card-not-present recurring payments, an individual provides his or her PAN and related data to a merchant (e.g., via phone or postal mail). The merchant utilizes the PAN to initiate an authorization request, and upon receiving an authorization request response indicating approval, will complete the recurring transaction.

In some cases, there can be payment card accounts which do not have physical cards or other physical payment devices associated therewith; for example, a customer can be provided with a PAN, expiration date, and security code but no physical payment device, and use same, for example, for card-not-present telephone or internet transactions. In this regard, a "cardholder" should be understood to refer to the account holder of a payment card account, regardless of whether the holder actually has a physical payment card or other physical payment device.

Figure 2:
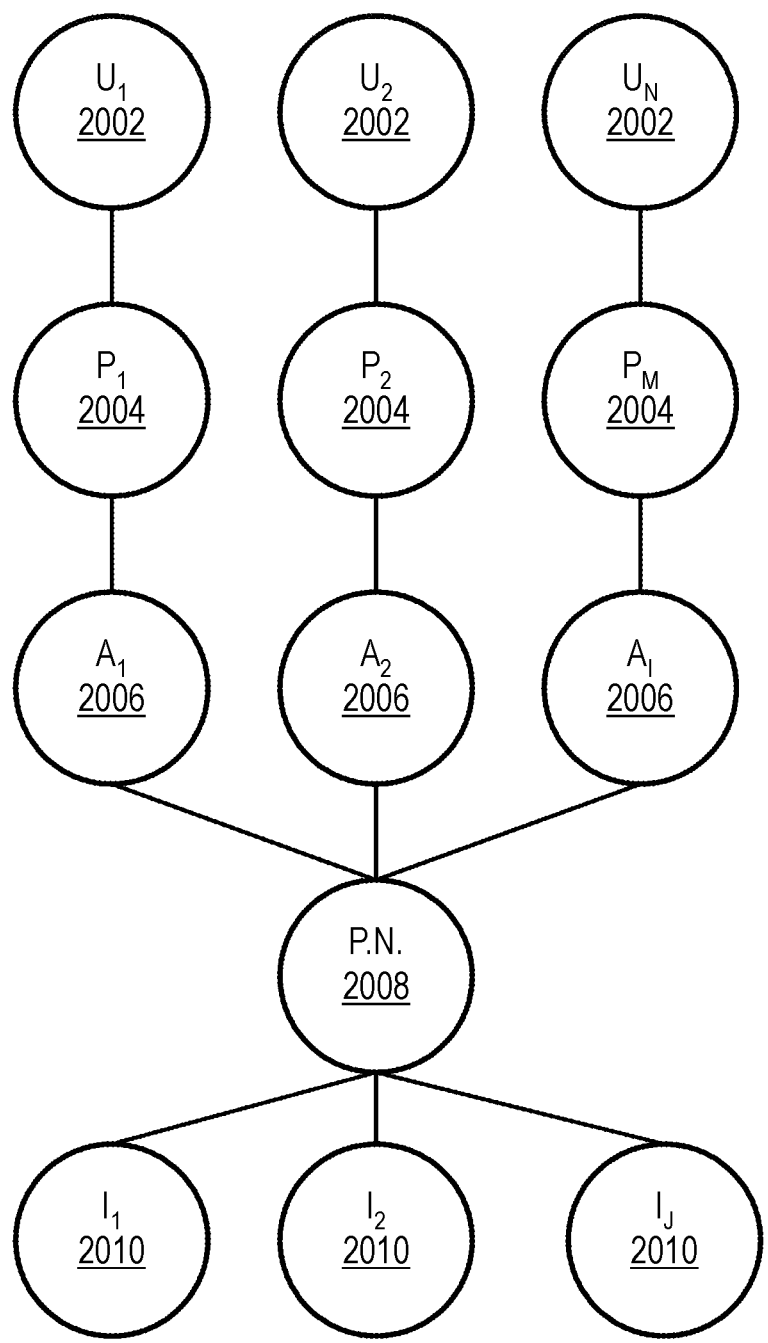
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers, useful in connection with one or more embodiments of the disclosure.

With reference to FIG. 2, an exemplary relationship among multiple entities is depicted. A number of different users (e.g., consumers) 2002, $U_1$, $U_2$ . . . $U_N$, interact with a number of different merchants 2004, $P_1$, $P_2$ . . . $P_M$. Merchants 2004 interact with a number of different acquirers 2006, $A_1$, $A_2$ . . . $A_I$. Acquirers 2006 interact with a number of different issuers 2010, $I_1$, $I_2$ . . . $I_J$, through, for example, a single operator 2008 of a payment network configured to facilitate transactions between multiple issuers and multiple acquirers; for example, Mastercard International Incorporated, operator of the BANKNET® network, or Visa International Service Association, operator of the VISANET® network. In general, N, M, I, and J are integers that can be equal or not equal. Note, also, that elements 2006, 2010 represent the entities that actually carry out processing for the acquirers and issuers respectively; in some instances, these entities carry out their own processing; in other entities, they utilize acquirer processors and issuer processors, respectively.

During a conventional credit authorization process, the cardholder 2002 pays for the purchase and the merchant 2004 submits the transaction to the acquirer (acquiring bank) 2006. The acquirer verifies the card number, the transaction type, and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

Figure 9:
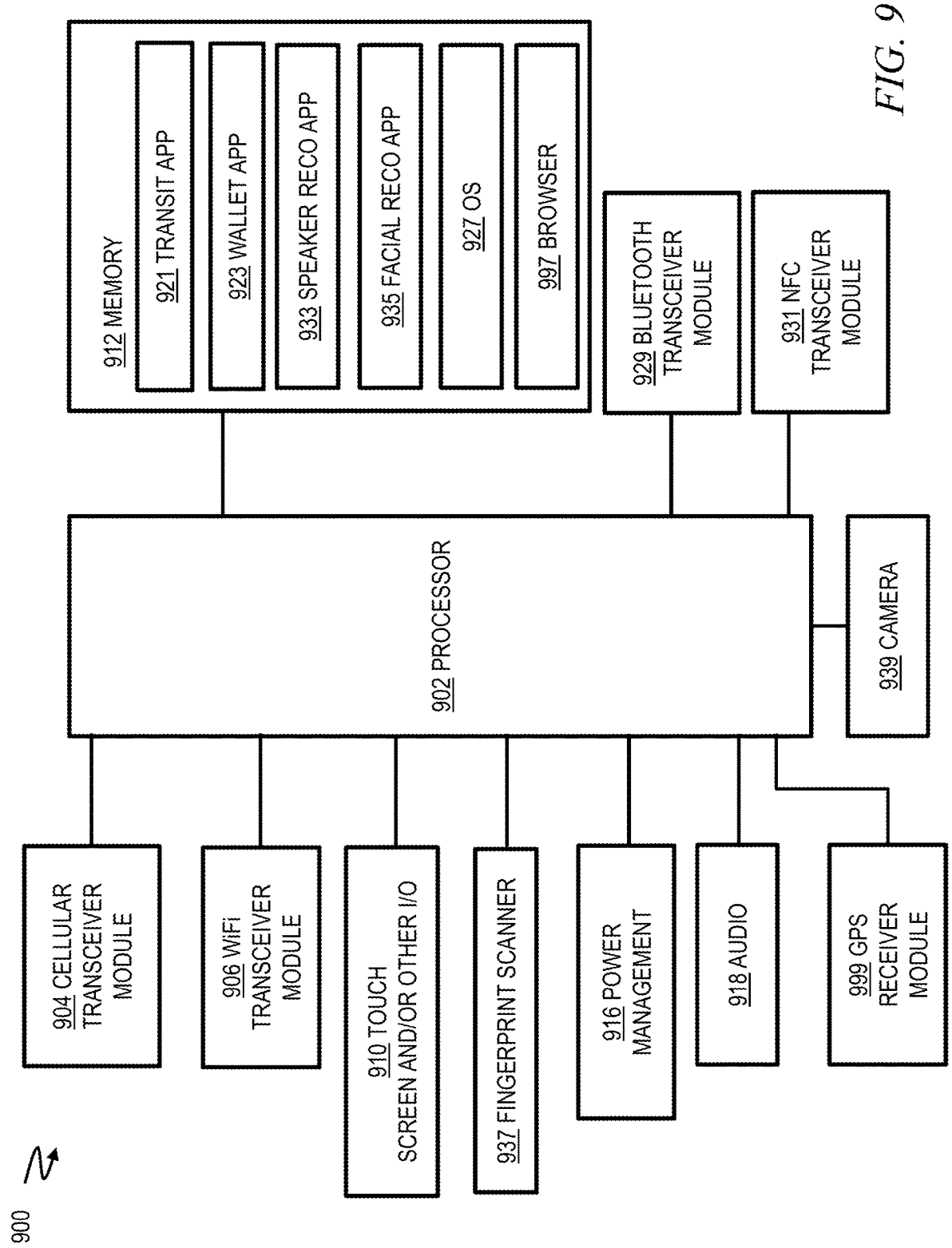
FIG. 9 is a block diagram of a "smart" phone or tablet computer configured in accordance with another aspect of the disclosure.

It will be appreciated that the network 2008 shown in FIG. 2 is an example of a payment network configured to facilitate transactions between multiple issuers and multiple acquirers, which may be thought of as an "open" system. Some embodiments of the disclosure may be employed in relation to payment card accounts using other kinds of payment networks, for example, proprietary or closed payments networks with only a single issuer and acquirer. Furthermore in this regard, FIG. 2 depicts a four party model, as will be known to the skilled artisan; the four parties are the consumer 2002, merchant 2004, acquirer 2006, and issuer 2010. The skilled artisan will also be familiar with three-party models, wherein the acquirer and issuer are the same entity. Note that a three-party model (proprietary or closed payments network), where authorization nevertheless involves a communication with an issuer, is to be distinguished from a closed-loop transit environment or the like with a transit-centric PNIP standing in for an issuer during credential authentication as well as from a prior-art closed loop proprietary transit environment such as is depicted in FIG. 9 of co-assigned U.S. Patent Publication 2017-0200149 A1 of Alexander Antunovic et al., expressly incorporated herein by reference in its entirety for all purposes.

Messages within a network such as network 138 and/or network 2008, may, in at least some instances, conform to the International Organization for Standardization (ISO) Standard 8583, Financial transaction card originated messages Interchange message specifications, which is the ISO standard for systems that exchange electronic transactions made by cardholders using payment cards. It should be noted that the skilled artisan will be familiar with the ISO 8583 standards. Nevertheless, out of an abundance of caution, the following documents are expressly incorporated herein by reference in their entirety for all purposes (published by ISO, Geneva, Switzerland, and available on the ISO web site):

ISO 8583 Part 1: Messages, data elements and code values (2003)
ISO 8583 Part 2: Application and registration procedures for Institution Identification Codes (IIC) (1998)
ISO 8583 Part 3: Maintenance procedures for messages, data elements and code values (2003)
ISO 8583:1993 (1993)
ISO 8583:1987 (1987)

As used herein, a "payment card network" is a communications network that uses payment card account numbers, such as primary account numbers (PANs), to authorize, and to facilitate clearing and settlement of payment card transactions such as for credit, debit, stored value and/or prepaid card accounts. The card accounts have standardized payment card account numbers associated with them, which allow for efficient routing and clearing of transactions; for example, ISO standard account numbers such as ISO/IEC 7812-compliant account numbers. The card accounts and/or account numbers may or may not have physical cards or other physical payment devices associated with them. For example, in some instances, organizations have purchasing or procurement card accounts to which a payment card account number is assigned, used for making purchases for the organization, but there is no corresponding physical card. In other instances, "virtual" account numbers are employed; this is also known as PAN mapping. The PAN mapping process involves taking the original Primary Account Number (PAN) (which may or may not be associated with a physical card) and issuing a pseudo-PAN (or virtual card number) in its place. Commercially available PAN-mapping solutions include those available from Orbiscom Ltd., Block 1, Blackrock Business Park, Carysfort Avenue, Blackrock, Co. Dublin, Ireland (now part of Mastercard International Incorporated of Purchase, N.Y., USA); by way of example and not limitation, techniques of U.S. Pat. No. 6,636,833 (expressly incorporated herein by reference in its entirety for all purposes) and U.S. Pat. No. 7,136,835 (expressly incorporated herein by reference in its entirety for all purposes) of Flitcroft et al.

Tokenization is a process of replacing a card's primary account number (PAN)—the 16-digit number (or a different length number in some cases) embossed on the front of a plastic card—with a unique alternate card number, or "token." Tokens can be used for mobile point-of-sale transactions, in-app purchases, or online purchases. A token is a numeric value that acts as a substitute for a PAN. In current techniques, a predetermined number of tokens (e.g., up to 9) can be mapped to the PAN, enabling each connected device to have a unique token. MDES is a suite of on-behalf-of services for Issuers that provides end- to-end tokenization of card credentials. These digital services enable a connected device—smartphone, tablet, etc.—to be safer and more secure. Thus, tokenization is the replacement of the card's primary account number (PAN) with an alternative card number that is specific to the device, while digitization is the process that delivers the now 'tokenized' card details to mobile devices or servers, enabling greater safety & security across the payments eco-system.

Consider electronic wallet solutions such as Mastercard's MASTERPASS® service (registered mark of Mastercard International Incorporated). It is worth noting that MASTERPASS® is a Digital Acceptance Brand similar to PAYPAL® (registered mark of PAYPAL, INC., San Jose, Calif., USA), APPLE PAY (registered mark of Apple Inc., Cupertino, Calif., USA), and the like. MASTERPASS® is a non-limiting example of a wallet into which a token can be provisioned using MDES or a similar tokenization service.

Some payment card networks connect multiple issuers with multiple acquirers; others use a three party model. Some payment card networks use ISO 8583 messaging. Non-limiting examples of payment card networks that connect multiple issuers with multiple acquirers are the BANKNET® network and the VISANET® network. Other non-limiting examples of payment card networks include the AMERICAN EXPRESS® and DISCOVER® networks.

Figure 3:
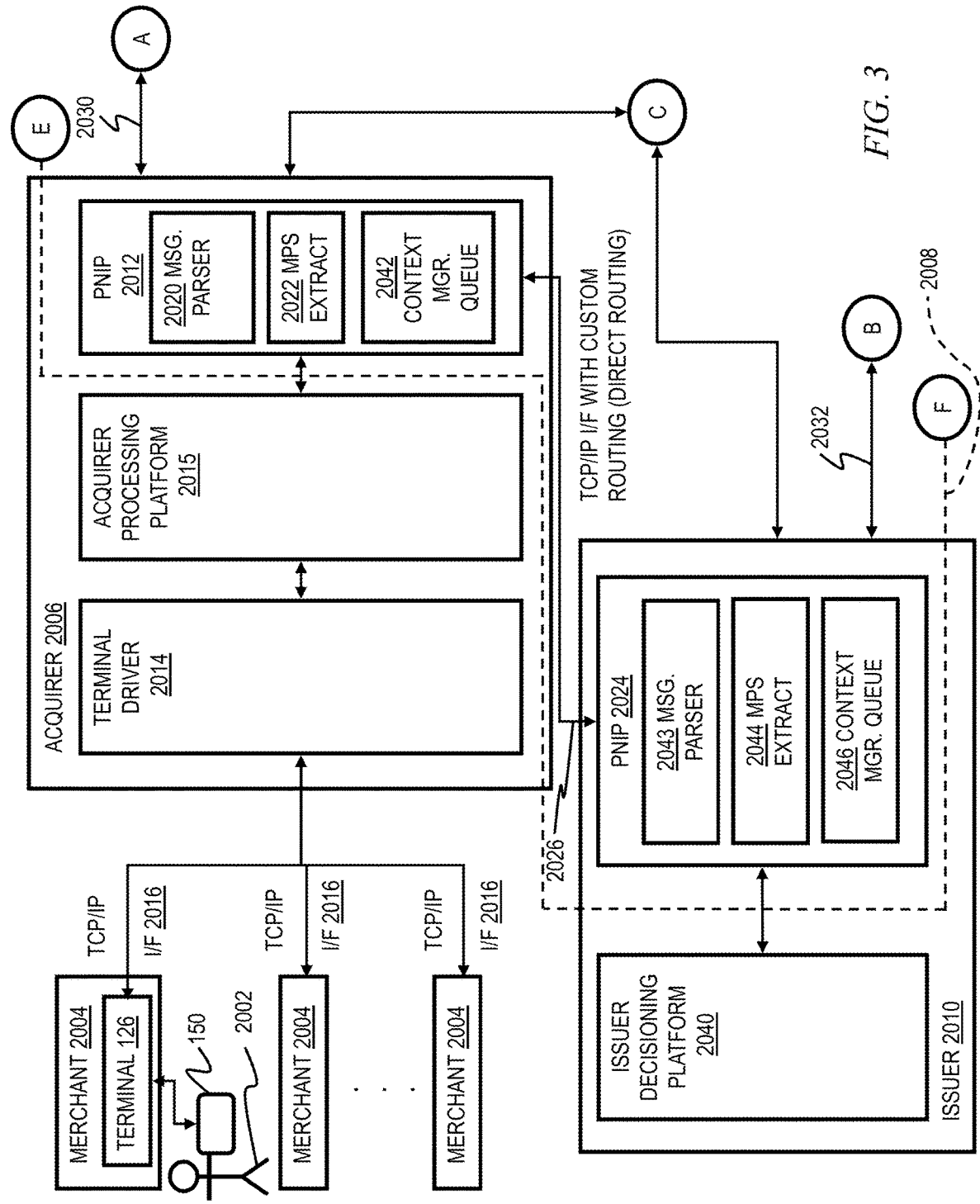
FIGS. 3 and 4 provide an exemplary detailed view of operation of an exemplary payment card network, in accordance with an aspect of the disclosure.
Figure 4:
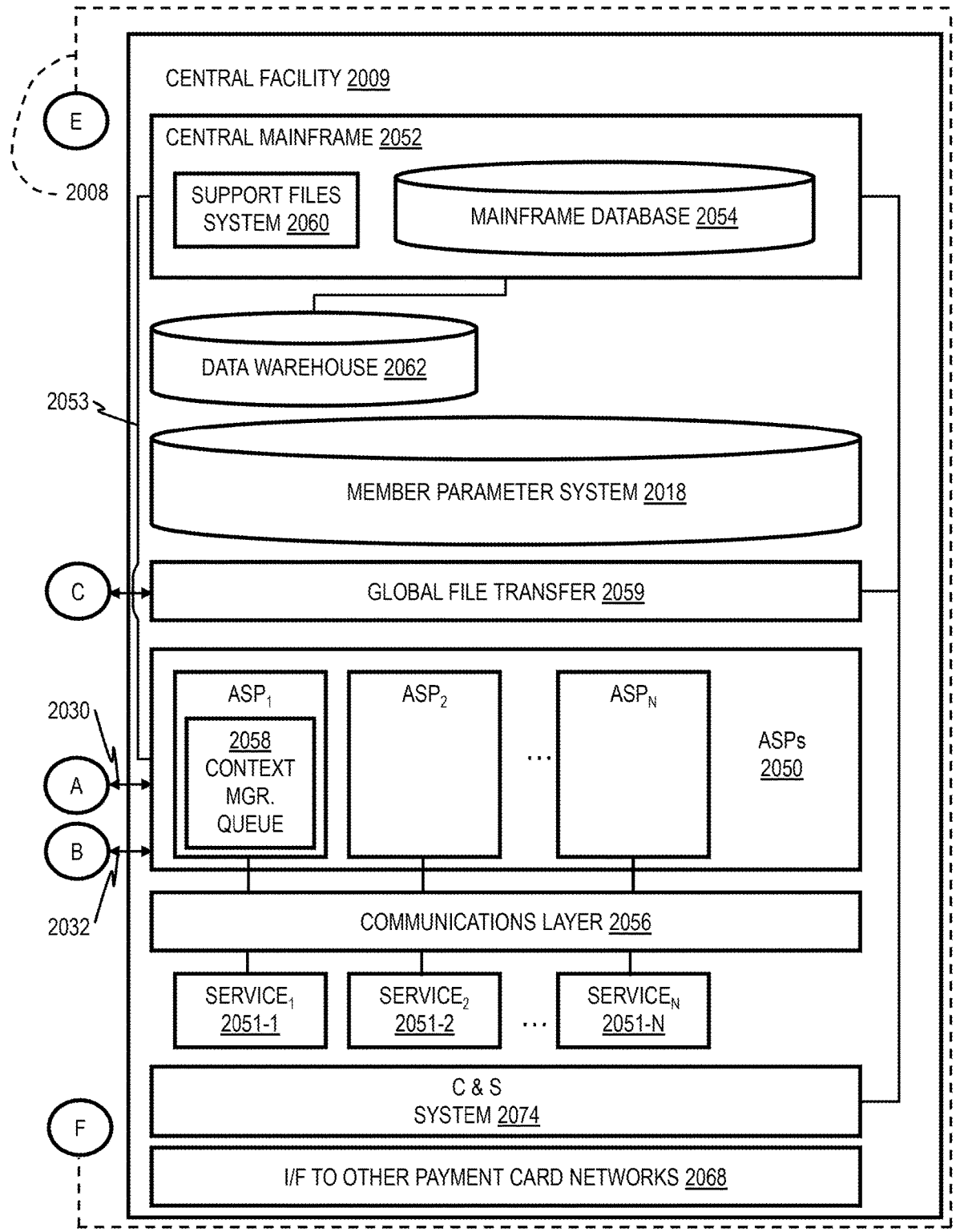

Still referring to FIG. 2, and with reference also now to FIGS. 3 and 4, by way of review and provision of additional detail, a consumer 2002 effectively presents his or her card 150 or other payment device (e.g., presents suitably configured "smart" phone or uses an e-wallet) to the terminal 126 of a merchant 2004. A mag stripe card 150 and combined terminal 126 are shown by way of example, but are intended to generally represent any kind of payment device and any kind of terminal. The effective presentation can happen directly (user enters a brick and mortar location of a merchant 2004) or virtually (user logs on to a web site of a merchant 2004 via a browser of a personal computer or the like, or calls on the telephone, and provides card information, or sends a "snail" mail with payment card account information to a merchant). The merchant terminal 126 captures the card account information (by swiping or wireless communication if directly presented; by manual keying or reading data if remote) and forwards same to the acquirer 2006. Interaction between the merchant and cardholder is outside the purview of the payment card network per se. The payment card network becomes involved at the connection between the acquirer 2006 and network 2008; the dotted line between points E and F in FIGS. 3 and 4 encompasses the network 2008. Note generally that points A, B, C, E, and F in FIG. 3 connect to the corresponding points in FIG. 4; the entire network and associated environment are not amenable to illustration on a single sheet.

The acquirer 2006, in the specific example of FIGS. 3 and 4, has at its premises a payment network interface processor (PNIP 2012). The Mastercard Interface Processor or MIP is a non-limiting example of a PNIP. In a non-limiting example, the PNIP is implemented on a rack-mounted server. PNIPs are typically located at the edges of the payment card network. In at least some instances, the payment card network of FIG. 2 is a distributed network wherein each acquirer and issuer has at least one PNIP on their premises. Each acquirer 2006 will have a relationship with one or more merchants 2004 and will interface with the merchants' terminals 126 via terminal driver 2014 (an acquirer may also act as an acquirer for themselves as a merchant). Furthermore in this regard, the merchant locations will have terminals where the cards are swiped (or where contacted or contactless devices are presented). The acquirer will employ terminal driver 2014 to interface with those terminals. Terminal driver 2014 is a logical block representing software and/or hardware that allows the acquirer processing platform 2015 to communicate with the terminals of the merchants via TCP, dial up, or the like (TCP/IP interfaces 2016 are shown in the example in the figures). Each merchant will decide what acquirer to use to accept one or more brands of payment cards, and the acquirer will set the merchant up with the appropriate software and/or firmware for the merchant's point of sale devices.

The acquirer 2006 will present transactions from many different merchants 2004 to the payment card network operator 2008 via the PNIP interface 2012. The connection between the merchants 2004 and the acquirer 2006 is typically a TCP/IP interface 2016. The format that the transaction is in when the card is swiped at the merchant 2004 may differ from the format that the transaction is in when actually received by the payment card network operator. The acquirer may convert the transaction into the ISO 8583 format or into a format that is a specific implementation of the ISO 8583 format (e.g., the MASTERCARD CIS (customer interface specification) format). The authorization request message can be an ISO 8583 message type identifier (MTI) 0100 message, for example, sent over the communications interface 2016 between the merchant 2004 and the acquirer 2006.

Once the 0100 message is received at the PNIP 2012 of the acquirer 2006, a series of edits can be performed on the transaction with respect to format, content, and/or context. Furthermore, screening can be carried out to determine whether the message relates to something beyond an ordinary authorization request, referred to as an enhanced service. Enhanced services may be screened for on behalf of one or more issuers 2010 and/or the operator of network 2008 itself. A centralized member parameter system (MPS) 2018 can be provided to house parameters used to drive processing of credit authorization transactions. In one or more embodiments, extracts from the centralized member parameter system 2018 are distributed to all acquirer PNIPs 2012 and issuer PNIPs 2024 on the network 2008 on a daily basis to drive processing of credit card transactions.

It should be noted at this point that an "ICA" and a "BIN" are employed in BANKNET so that a member can perform card issuing and/or acquiring activities. An ICA or Interbank Card Association is a four to six digit identification assigned by Mastercard for use by a member to uniquely identify activity the member is responsible for. A BIN or Bank Identification Number is a unique series of numbers assigned by Mastercard to a principal member and used as the first six digits of a cardholder account number. Other payment card networks have similar types of numbers, as will be apparent to the skilled artisan.

In at least some embodiments, the same member parameter extract is sent to all PNIPs and transactions are routed using same. In at least some circumstances, account numbers or ranges of account numbers are used in deciding how to route. In some cases, transactions are routed to an issuer PNIP based on where the account range is "signed in." Issuers send an MTI 0800 sign in request message with either a group ID or account range. The Member ID is pulled from the PNIP port 2038 configuration and transactions from that account range are then routed to the port from which the sign-in request is received. A member ID can be present on ports on multiple PNIPs at an Issuer site—see discussion of FIG. 7 below.

In one or more embodiments, based on the account range, the parameters in MPS 2018 (or a local extract thereof) will determine how to process a given transaction; e.g., product code, country code, currency code, and the like, including what enhanced services (if any) the issuer has signed up for on a particular account range. That is to say, the messages are parsed and certain fields, including the account range, are examined; the account range is associated with a certain issuer and based on that, the message may be treated differently. Messages may be parsed, and converted into an internal data format so that access can be obtained to all the individual data elements. In one or more embodiments, the account number is used as a key to access the MPS 2018 (or a local extract thereof) and retrieve all the parameters that are appropriate for processing the given transaction. In a non-limiting example, a suitable message parser 2020 (and other programs on the PNIP 2012) can be written in an appropriate high-level language or the like.

In an exemplary embodiment, the central MPS 2018 creates extracts once a day that are distributed out to the endpoints on the network (e.g., PNIPs 2012), as seen at 2022. These extracts include the pertinent information needed for the PNIP to process the message and determine if it requires any special handling. In some instances, messages are next routed to a central site 2009 for performance of enhanced services. On the other hand, if no special services are required, the message may be routed directly to the issuer PNIP 2024 as seen at 2026.

Messages routed directly to the issuer PNIP: In this aspect, the transaction is routed directly to the issuer PNIP 2024 based on the MPS extract 2022, as seen at 2026. Every account range will have a unique destination endpoint identified in the parameters (account ranges may be grouped and all members of the account range group may have a common destination endpoint). The member interface refers to the connection between the acquirer processor 2006 and the Acquirer PNIP 2012. This term also applies to the interface between the Issuer PNIP 2024 and issuer processor 2010. The connections between and among acquirer PNIP 2012 and issuer PNIP 2024, acquirer PNIP 2012 and ASPs 2050, and ASPs 2050 and issuer PNIP 2024 are referred to as a network interface onto the payment card network itself (elements 2050 are discussed below). In one or more embodiments, this may be a TCP/IP connection (as seen at 2026) with customized routing capabilities including group addresses. Normally, TCP/IP addresses refer to a single endpoint. Group addresses may be directed to a group of addresses, and will target any of the computers (e.g., PNIPs) in the group using a variety of protocols. Some use a round robin approach; others may use a first in list approach where the message is always routed to one given computer first and then to a second computer only if the first is not available. Group addressing may be useful, for example, where an acquirer or issuer has multiple PNIPS at the same location for redundancy/fault tolerance. It is also possible to combine the approach and institute a round robin, wherein the addresses within the round robin are first in list group address, or conversely, it is possible to institute a first-in-list, wherein the addresses within the first-in-list are round robin group addresses. These capabilities are useful in case of outages, maintenance, and the like.

Figure 5:
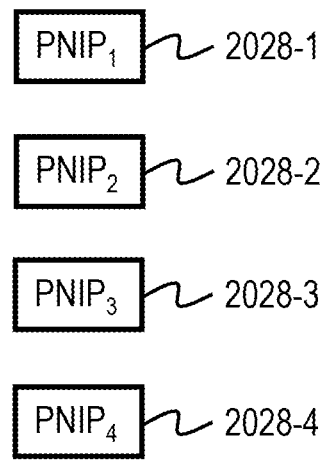
FIG. 5 shows a group of payment network interface processors, such as may be used with the network of FIGS. 3 and 4.
Figure 6:
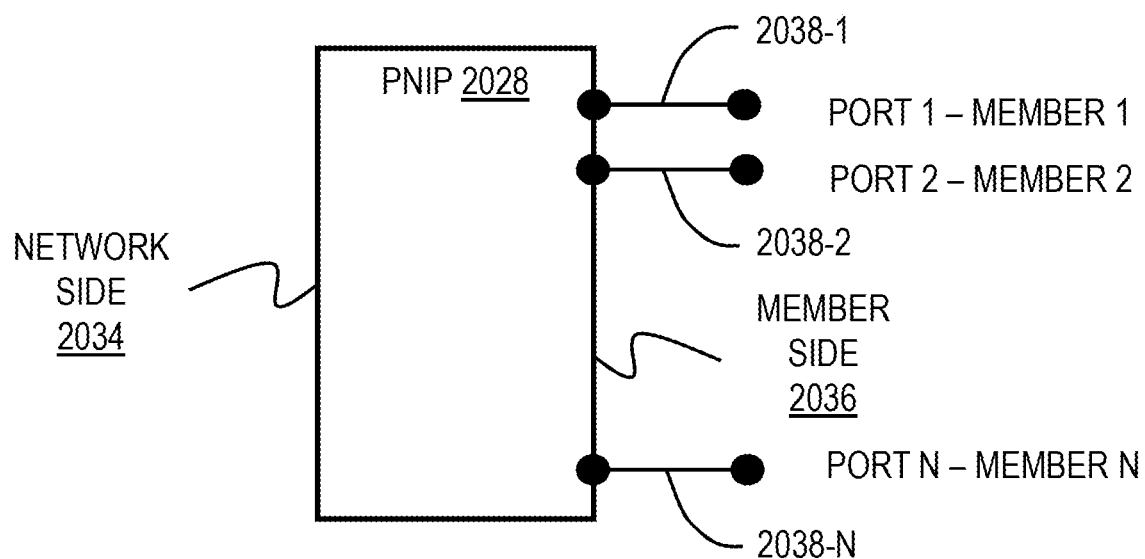
FIG. 6 shows a port arrangement on a payment network interface processor, such as may be used with the network of FIGS. 3 and 4.

FIG. 5 shows a non-limiting example with four PNIPs 2028-1 through 2028-4. In a round robin approach, a first message is routed first to PNIP 2028-1, a second message to PNIP 2028-2, a third message to PNIP 2028-3, a fourth message to PNIP 2028-4, a fifth message to PNIP 2028-1, and so on. In a first in list approach, all messages are routed to PNIP 2028-1; if it is not available for a given message, the message is routed to PNIP 2028-2; if PNIP 2028-2 is not available, the message is routed to PNIP 2028-3; if PNIP 2028-3 is not available, the message is routed to 2028-4. Each PNIP 2028-1 through 2028-4 in FIG. 5 could be a single machine or a group of machines addressed by first in list or round robin as discussed just above. In one or more embodiments, the physical network 2026 between PNIPs 2012, 2024 and the physical network 2030, 2032 between PNIPs 2012, 2024 and the central site 2009 is a private Multiprotocol Label Switching (MPLS) TCP/IP network and is not the Internet. Once the issuer's network group address has been determined by the PNIP 2012 (or ASP 2050), the message is routed to the issuer PNIP 2024. Once the 0100 auth message arrives at the issuer PNIP 2024, additional edits are performed to double check and make sure that the message has been routed to the correct location. Furthermore, the member ID is examined, because some issuers may share a single PNIP and it is necessary to determine which of the issuers (members) sharing that PNIP the transaction in question is to be routed to. Each of the issuers sharing the PNIP will have its own port on the member side of the PNIP; the transaction is routed to the appropriate port based on the member parameters. See FIG. 6 where a generalized PNIP 2028 has a network side 2034 and a member side 2036. Member side 2036 has N ports 2038-1 through 2038-N to members 1 to N. N is used herein as a generalized arbitrary integer and the value of N in FIG. 6 is not necessarily the same as that of N in connection with elements 2002 in FIG. 2, for example.

Figure 7:
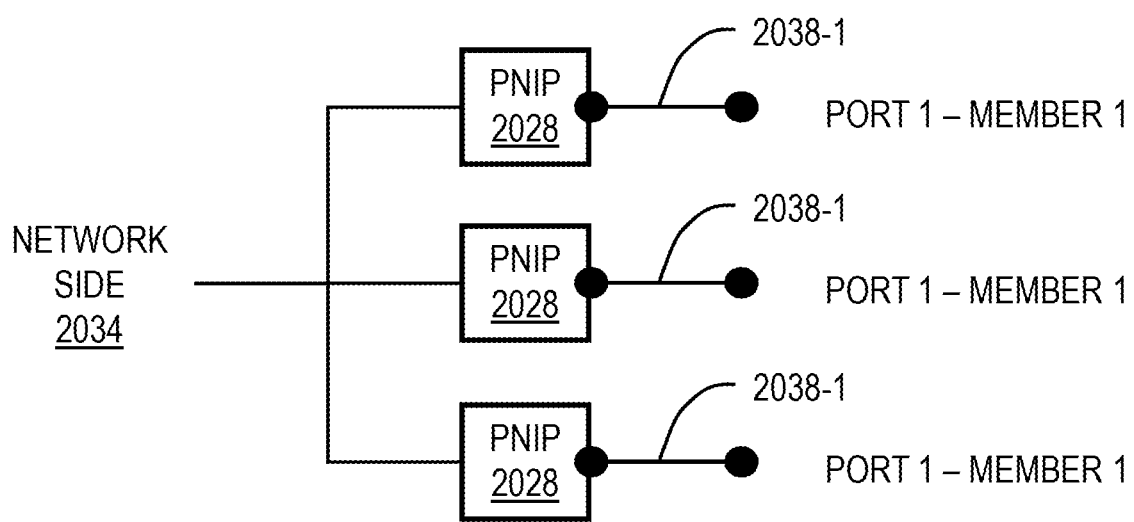
FIG. 7 shows an illustrative case wherein an issuer has multiple payment network interface processors.

As seen in FIG. 7, in some instances, an issuer has multiple PNIP devices 2028 at a single site, with a network-side connection 2034, and with multiple PNIPs 2028 all connected to the same host system (each has port 1 2038-1 associated with the same member (issuer)).

At this point, the 0100 message has been delivered to the issuer 2010. The issuer 2010 then carries out issuer processing and decisioning (e.g., with issuer processing platform 2040) based on transaction velocities, open to buy, fraud detection protocols, etc., and provides an appropriate authorization request response, ISO 8583 MTI 0110. There are a number of different possible response codes defined within ISO 8583 and its particular implementations. Each transaction is made up of multiple data elements; the response from the issuer is included in data element 39. Once the 0110 message is received on the issuer PNIP 2024 from platform 2040 it is parsed and edited for format, content, and context, including validation of DE39 to make sure that it is a valid value.

It is worth noting that in one or more instances, at every point where a transaction touches a computer of the payment card network, whether it be an acquirer PNIP 2012, issuer PNIP 2024, or a special services computer or computers 2050 at the central location 2009 (discussed below), transaction context is preserved. That is to say, before the message is sent on to the next node in the network, a copy is saved in a context manager queue 2042, 2046, 2058, so that when the transaction response MTI 0110 comes back through, the request MTI 0100 can be matched with the response, in order to know how to route the response back to the previous route point. One of the items saved in the context manager queue is the message originator's address, so that it can be used for route-back information. Once the issuer PNIP validation is complete, including format, content, and context edits, the transaction is extracted from the context manager queue 2046 and the route-back address is retrieved, and the 0110 message is then sent back where it came from; in this case, the acquirer PNIP 2012 (or ASP 2050). The acquirer PNIP 2012 then receives and parses the message and pulls its original request out of its context manager queue 2042. Note that multiple acquirers may share an acquirer PNIP and it is therefore necessary to know which port on the acquirer PNIP to route the response back to (see discussion of FIG. 6). Checking the message against the original request in the context manager queue allows the message to be routed back to the correct port.

Each PNIP 2012, 2024 typically has many different programs. These can include, for example, a parser/editor 2020, 2043; a parameter file manager; a transaction context manager; a member communications program; a network communications program; and the like. Please note that to reduce clutter, FIGS. 3 and 4 show "MPS extract" 2022, 2044; this will typically include the extract itself and the associated parameter file manager which manages obtaining the extracts from MPS 2018. Similarly, to reduce clutter, FIGS. 3 and 4 show "context manager queue" 2042, 2046; this will typically include the queue itself and the associated manager which manages the contents of the queue. In one or more embodiments, there is also a communication program used to communicate between the other programs (inter-process communications) on the PNIP; this is omitted from FIGS. 3 and 4 to avoid clutter.

Messages in case of Enhanced Services: In one or more instances, a special architecture is used to facilitate delivery of enhanced services (the ASP 2050 in FIG. 4 is a non-limiting example). Examples of enhanced services include the MASTERCARD IN CONTROL product providing spending controls and/or virtual card numbers (MASTERCARD IN CONTROL is generally representative of spend control systems, card control systems, and the like, and embodiments indicated as employing MASTERCARD IN CONTROL are not intended to imply any limitation to one particular spend control and/or card control system). Other examples of enhanced services are payment tokenization, loyalty rewards, recurring payment cancellations, and the like. One or more instances do not deploy this complex logic out to the network edge. Furthermore in this regard, the issuer and acquirer PNIPs 2012, 2024 are referred to as being on the edge because they reside on the customer's premises 2006, 2010. There may be over 2000 PNIPs on a typical network. The special architecture used in one or more instances is a central site type architecture associated with location 2009. At the central site 2009, certain computers are referred to as authorization services processors or ASPs 2050.

On the acquirer PNIP 2012, when checking the member parameter file for an account range, determine whether the transaction requires enhanced services. If yes, the transactions is routed to the central site ASPs 2050, which have interfaces to all of the service provider systems—the ASPs do not necessarily provide the services themselves (although they can in some embodiments), but may mediate between the network (e.g., BANKNET) and the actual service providers 2051-1 through 2051-N. An ASP will typically have connections 2053 to a mainframe 2052 via DB2 connect or other suitable connection. If a transaction is to be enriched with additional data, a database call will be made to the mainframe 2052 to retrieve the information from mainframe database 2054 so that it can be inserted into the transaction before the transaction is forwarded to the issuers. Interfaces can also be provided to a risk management system, a decisioning management system, MASTERCARD IN CONTROL, rewards, and the like. Service providers 2051-1 through 2051-N generally represent any enhanced services, non-limiting examples of which have been given herein.

A communications layer 2056 is used to communicate with the service providers in one or more embodiments, a non-limiting example of a suitable implementation is the IBM MQ series. The 0100 message may be sent to the service providers, optionally encapsulated inside a special "enhanced services" (ES) header that wraps the message with any additional information required to fulfill the service. The service provider sends a response. The ASP takes the response and enriches the 0100 transaction with the service response, and then sends the entire package on to the issuer PNIP 2024. Some enhanced services are processed on the request messages (0100) and others are processed on the response messages (0110). Once the response message is processed on the ASP, the original message will be pulled from the context manager queue 2058 on the ASP to determine the appropriate acquirer PNIP 2012 to route the message back to. From there, the acquirer PNIP will behave just as in the "Messages routed directly to the issuer PNIP" case discussed above. Some embodiments of the special architecture use an Enterprise Service Bus to mediate and facilitate some of the services 2051. For example, the MASTERCARD IN CONTROL service can be accessed via an instance of an Enterprise Service Bus.

Entry of Data into the Data Warehouse: In one or more instances, every transaction that flows through the issuer PNIP 2012, acquirer PNIP 2024, and/or ASPs 2050 is logged at every point by writing log records. Multiple times a day (e.g., six), a global file transfer system 2059 pulls the logs off each node and collects them into a support files system 2060 on the mainframe 2052. The log files are parsed and collected into a general daily file. The general daily file is scrubbed and modified to create a consolidated file on the mainframe which is then pulled into the data warehouse 2062, where additional data manipulation and scrubbing are performed before the transactions are stored. The data warehouse 2062 is located at an intermediate node (location 2009) connected to the PNIPs of the acquirers and issuers 2012, 2024. By way of clarification, in one or more embodiments, the node 2009 is directly connected to the PNIPs 2012, 2024 but the data warehouse is not directly connected to the 2012 and 2024 devices; rather, data flows through GFT and SF systems 2059, 2060 and ends up in the data warehouse 2062. Data warehouse 2062 should be distinguished from a data warehouse 154 that might be maintained by an issuer.

Clearing and Settlement: One or more instances employ a clearing and settlement system 2074. In clearing, via global file transfer 2059, acquirers submit clearing files in an appropriate message format (in a non-limiting example, Integrated Product Messages (IPM) format). The files contain, from the acquirers' perspective, what they believe they should be paid for. In one or more instances, the authorization does not actually move any money; the authorization only validates that the cardholder is a valid cardholder recognized by the bank, which will honor payment to the merchant for the goods or services. For example, in a typical restaurant visit, the card is swiped for the receipt amount but then a tip is added. The clearing message will have the actual food amount plus the tip. In one or more instances, the clearing does not actually move the money; it merely resolves the actual amounts. The settlement system actually initiates movement of the money. Furthermore in this regard, the settlement system actually tells the banks how much money to move but does not actually move the money. Within clearing, processes include dispute resolution, chargeback, and the like. During clearing, files are sent from the acquirers to the payment card network; the payment card network, using clearing and settlement system 2074, then takes the files and splits them and sorts them by issuer. Response files are then received from each issuer, and these response files are again split and re-sorted back to the correct acquirers. Eventually, data flows into the settlement system and money is moved. Thus, at a high level, the auth request and auth request response are in real time, and the clearing and settlement are in a batch mode.

By way of review and provision of additional detail, in at least some instances, in a batch mode, clearing is initiated via an ISO 8583 MTI 1240 message having a DE24 function code value of 200 for a first presentment. Once this message is obtained from the acquirer, the payment card network, using clearing and settlement system 2074, will undertake syntax edits, format edits, content edits, and context edits (typically applied to every transaction). If those edits are passed, the interchange and fees associated with the transaction will be calculated. Based on the calculations, the message may also be enriched with additional information before being passed on to the issuer. The settlement amount is then determined. Within the clearing cycle, the amounts of money due to each given member (e.g., issuer or acquirer) are accumulated, and these are summed up into a settlement file which is forwarded in due course.

Cryptographic aspects: Consider the concepts of data at rest and data in motion. An example of data at rest is the log files that actually reside on the PNIPS themselves—configuration information containing card numbers or personally identifiable information (PII). In one or more embodiments, all sensitive data at rest is encrypted before being written to disk. Data in motion refers to data actually moving over a transmission medium (e.g., wires, coaxial cable, fiber optic cable, RF link). All PCI-sensitive data (PCI Security Standards Council, LLC, Wakefield, Mass. USA) is encrypted, whether written to disk or being sent over a network. In at least some instances, internal links within the premises of the acquirers and issuers are not encrypted since it is assumed that the customer premises are a physically secure facility relying on physical security of the hardware. On the other hand, in at least some instances, external links (e.g., links 2026, 2030 and 2032) are all encrypted for both authorization traffic and bulk file transfers.

One or more embodiments will have interface(s) 2068 to other brands of payment card processing network. For example, a MASTERCARD branded payment card processing network may have interfaces to networks such as AMERICAN EXPRESS, VISA, JCB, DISCOVER, and the like. Suitable translation layers can be provided to intermediate between MASTERCARD (or other) format and formats used by other networks, as appropriate. In one or more embodiments, interfaces 2068 to other payment networks are provided via a machine, located at 2009, but generally analogous to an Issuer PNIP 2024 with added mediation layers loaded as required by other payment network formats. Some merchants may only have a single interface to, e.g., the MASTERCARD network—all transactions from that merchant may be routed to MASTERCARD, regardless of what card was used—MASTERCARD will process those transactions and route them out to the appropriate networks.

Portable Computing Devices

FIG. 9 is a block diagram of an exemplary portable computing device, such as a smart phone 900, also representative of a tablet computing device, netbook, "Ultrabook" or other subnotebook, laptop, mobile electronic device, or the like. Smart phone 900 is typical of the kind of device which, when used with electronic wallet software, is beginning to supplant traditional payment cards. The above-mentioned tokenization techniques, such as MDES, can be used to deliver tokenized card details to the mobile device 900 through the digitization process.

Unit 900 includes a suitable processor; e.g., a microprocessor 902. A cellular transceiver module 904 coupled to processor 902 includes an antenna and appropriate circuitry to send and receive cellular telephone signals, e.g., 3G or 4G. A Wi-Fi transceiver module 906 coupled to processor 902 includes an antenna and appropriate circuitry to allow unit 900 to connect to the Internet via a wireless network access point or hotspot. The skilled artisan will appreciate that "Wi-Fi" is a trademark of the Wi-Fi Alliance and the brand name for products using the IEEE 802.11 family of standards. A Bluetooth transceiver module 929 coupled to processor 902 includes an antenna and appropriate circuitry to allow unit 900 to connect to other devices via the Bluetooth wireless technology standard. An NFC transceiver module 931 coupled to processor 902 includes an antenna and appropriate circuitry to allow unit 900 to establish radio communication via near-field communications.

One or more embodiments optionally include a transit application 921 in memory 912 which when executed causes the processor 902 to implement at least a portion of the functionality described herein. Operating system 927 orchestrates the operation of unit 900. Apple's iOS and Google's Android are non-limiting examples of suitable operating systems.

Touch screen 910 coupled to processor 902 is also generally indicative of a variety of input/output (I/O) devices such as a keypad, another type of display, a mouse or other pointing device, and so on, all of which may or may not be present in one or more embodiments. Audio module 918 coupled to processor 902 includes, for example, an audio coder/decoder (codec), speaker, headphone jack, microphone, and so on. Power management system 916 can include a battery charger, an interface to a battery, and so on. Memory 912 is coupled to processor 902. Memory 912 can include, for example, volatile memory such as RAM, and non-volatile memory such as ROM, flash, or any tangible computer-readable recordable storage medium which stores information in a non-transitory manner. Processor 902 will typically also have on-chip memory.

Fingerprint scanner 937 is coupled to processor 902 for biometric authentication purposes. An appropriate corresponding software application (not separately depicted) may reside in memory 912 in some instances. Many cell phones are equipped with a digital camera 939, shown coupled to processor 902. In some embodiments, camera 939 is used in conjunction with a facial recognition application 935 in memory 912 for biometric verification. In some embodiments, a microphone in audio module 918 is used in conjunction with a speaker recognition application 933 in memory 912 for biometric verification; a suitable acoustic front end can be provided. Every embodiment need not have every feature depicted; for example, in some instances, facial recognition and voice recognition can be optional back-ups to the fingerprint scanner. One or more embodiments can include a wallet application 923 as discussed elsewhere herein.

A GPS receiver module 999 coupled to processor 902 includes an antenna and appropriate circuitry to allow device 900 to calculate its position by precisely timing the signals sent by GPS satellites high above the Earth. Corresponding software optionally resides in memory 912.

Memory 912 can also include, for example, a stored PIN for comparison with a PIN entered via touch screen 910; extracted facial features from the legitimate owner of the phone for comparison with facial features extracted from a picture taken by camera 939; extracted fingerprint features from the legitimate owner of the phone for comparison with fingerprint features obtained from a scan carried out by scanner 937; and/or extracted voice features from the legitimate owner of the phone for comparison with voice features extracted from a voice sample obtained from a microphone in audio module 918, as appropriate (e.g., if optional features using these aspects are present). Note that elements in FIG. 9 are shown connected directly to processor 902; however, one or more bus structures can be employed in one or more embodiments. Furthermore, elements shown as implemented in software may be implemented at least in part in hardware for speed, if desired.

Browser program 997 in memory 912 deciphers html served out by a server such as 800 for display on screen 910 or the like.

Exemplary Transit Applications

Figure 10:
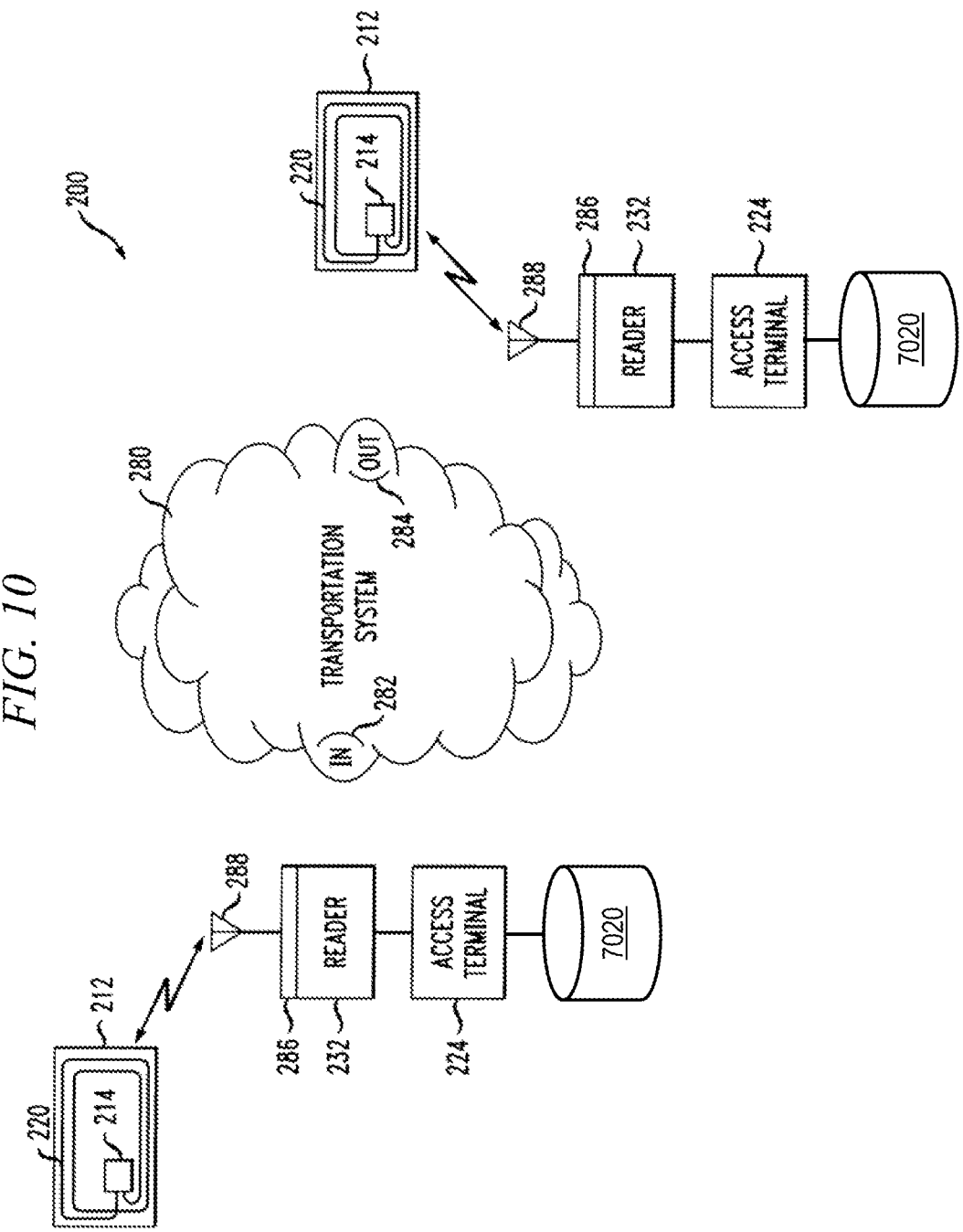
FIG. 10 shows one specific non-limiting exemplary application of techniques of the present disclosure to a transportation system.

Attention should now be given to FIG. 10, which depicts an exemplary system 200 applying certain techniques of the disclosure to an exemplary transportation system 280. It is to be understood that this is illustrative of one of many possible applications of techniques of the present disclosure. Passenger access to system 280 is controlled by portable payment devices such as "smart" contactless cards 212, payment-enabled mobile phones, or the like, together with terminals 224. Elements in FIG. 10 similar to those in FIG. 1 have received the same reference character incremented by 100 and will not be described in detail again. Thus, devices 212, chips 214, antennas 220, terminals 224 and reader modules 232 are similar to those discussed above with respect to FIG. 1. The reader modules can include communications circuitry 286 and antennas 288 for wireless communications with antennas 220. Contact, bar code, or magnetic stripe solutions could also be employed, in addition to or in lieu of contactless solutions. Certain BIN-based aspects of one or more embodiments of the disclosure, not related to tokenization per se, could optionally be employed to some extent with respect to magnetic stripe cards.

When a passenger wishes to enter system 280, the passenger causes device 212 to communicate with access terminal 224 (for example by touching or tapping at a designated location, or holding in close proximity to such location). As used herein, "communicate with" is intended to cover both one and two-way cases, for example, a two-way communication scenario with a terminal and chip card, as well as a one-way scenario wherein a terminal simply reads a magnetic stripe card. The touching, tapping, or other communication may result, for example, in recordation of the passenger's activity to enable subsequent calculation of a fare owed. A turnstile or other entrance barrier may then permit passage through entrance 282 to trains or other modes of transportation. In some cases, a passenger must again present device 212 when exiting at exit 284, as a fare may depend on a distance traveled (indeed, the fare may depend on a variety of factors such as modes of transport used, whether any transfers took place during the journey, the distance travelled, the number of transit zones crossed, the time of day, whether or not the device entitles the bearer to any concessionary discount, and so on). In one or more embodiments, entrance at 282 is permitted in some instances if an identifier (e.g., BIN range, token BIN range, PAR) or the like associated with card 212, smart phone, or other payment device is found in a local whitelist 7020 on or accessible to terminal/reader 224, 232.

Regarding the PAR (payment account reference), please refer to the "EMVCo White Paper on Payment Account Reference (PAR)," Version 1.0, November 2016, published by EMVCo, LLC, and expressly incorporated herein by reference in its entirety for all purposes.

Embodiments of the disclosure also contemplate additional method steps of opening a fare gate (for example, allowing a turnstile to turn) when appropriate; for example, when the card or other device is presented upon exit and/or entrance (and passes any required checks, if implemented in a particular instance).

It should be noted at this point that the complete disclosures of the following United States Patents and United States Patent Application Publications are expressly incorporated herein by reference in their entireties for all purposes:

U.S. Pat. No. 7,828,204 of Fiebiger et al., issued Nov. 9, 2010, and entitled "Techniques for Authorization of Usage of a Payment Device"

U.S. 2008/0033880 of Fiebiger et al., published 7 Feb. 2008, and entitled "Techniques for Authorization of Usage of a Payment Device" and its corresponding issued U.S. Pat. No. 8,584,936 mentioned above U.S. 2008/0156873 of Wilhelm et al., published Jul. 3, 2008, and entitled "Method And System For Using Contactless Payment Cards In A Transit System"

U.S. 2009/0210299 of Michael J. Cowen, published Aug. 20, 2009, and entitled "Method and Apparatus for Simplifying the Handling of Complex Payment Transactions"

Figure 11:
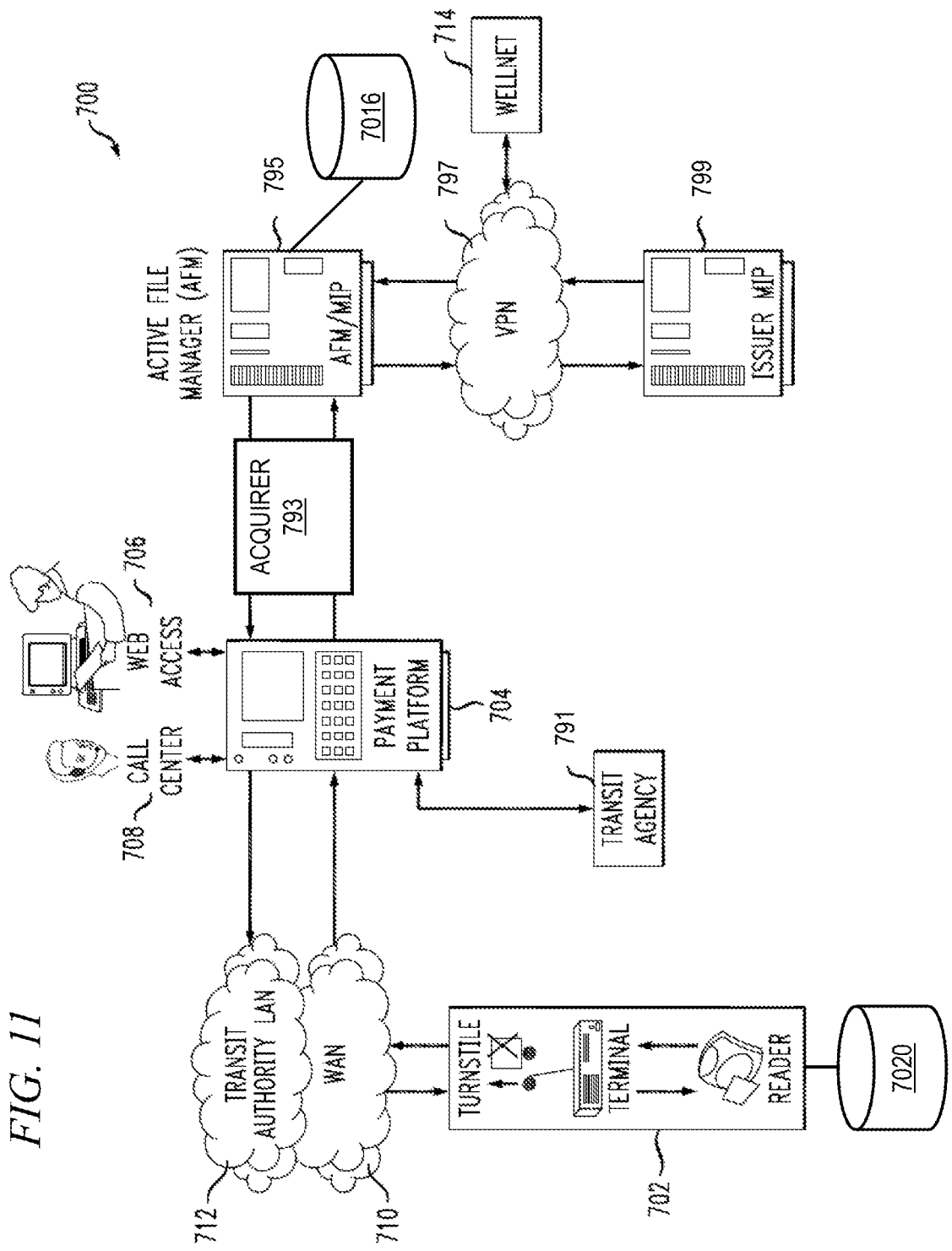
FIG. 11 is a system diagram of an exemplary transit solution that can implement techniques of the present disclosure.

Attention should now be given to FIG. 11, which depicts an exemplary detailed architecture for an exemplary automatic fare collection (AFC) solution 700. Note that elements 791, 793, and 797 generally correspond to elements 2004, 2006, and 2008, respectively, in FIG. 2. In general terms, three significant components of the system are the fare gate assembly (turnstile, reader and terminal) 702, payment platform 704, and active file manager (AFM) 795. The AFM 795 can be provided between acquirer 793 and VPN 797. AFM 795 could reside on the same machine as a conventional front end communications processor such as a PNIP like the MASTERCARD INTERFACE PROCESSOR™ or MIP™ processor (trademarks of Mastercard International, Inc. of Purchase, N.Y.), or could reside on a separate machine interfacing with such a conventional front end processor, which then interfaced with acquirer 793. Another conventional front-end communications processor 799, such as an issuer MIP™ processor, can be located, e.g., at the facility of an issuer to provide access to the aforementioned VPN 797. Platform 704 may optionally be in communication with assembly 702, for example, via WAN 710 and/or LAN 712. AFM 795 may also be in communication with platform 704, over a high speed communications network. In one or more embodiments, the connection between AFM 795 and platform 704 can be accomplished via a gigabit LAN connection.

In some cases, AFM 795 functions as a decision maker, going through appropriate criteria and performing a check for people attempting to access the transit system. Platform 704 functions as a record keeper, gathering records of ridership; keeping records of accounts; performing reconciliations and other accounting functions; updating account balances based on activity; facilitating registration; and so on. Platform 704 may also handle web access 706 and assist customer representatives in call center 708.

Still referring to FIG. 11, assembly 702 is preferably connected to platform 704 via a wide area network (WAN) 710 and/or a local area network (LAN) 712, such as that of a transit authority. The platform 704 may support the fare gate (broadly understood to include subway turnstiles, bus fare boxes, and the like) and account transactions by maintaining account statuses and routing requests and responses for authorization. Among the tasks that may be managed by platform 704 are:

routing fare gate transaction activity between the transit agency reader/terminals and the AFM.

managing the necessary funding options for contactless device customers and their associated accounts.

hosting a transit agency-defined fare table and transfer rules (the fare rules may be defined by the transit agency, often as part of a public process, and the platform 704 typically does not change these rules; rather its function is to apply these rules to riders' accounts and applying these fare and transfer rules to riders' accounts—since fare rules reside here, calculations of complex fares, for example, depending on distance traveled or discounts, may be performed here). Note that in some cases, the master copy (of the whitelist) may also be held here with local copies held at the gates.

preparing the information to facilitate clearing messages between transit agencies, their acquirers, and the operator of a payment card network, such as Mastercard International Incorporated.

receiving and managing the transit agency's Restricted Card List (RCL) or similar hotlist.

supporting customer service functionalities such as web site 706 and call center 708 interfaces.

"Well net" 714 is an exemplary monitoring and parameter management system for MIPs 795, 799.

Appropriate communications links may be provided between the platform 704 and the transit agency 791 and acquirer 793.

In one or more embodiments, entrance at 702 is permitted in some instances if an identifier (e.g., BIN range, token BIN range, PAR) or the like associated with a card or other payment device is found in a local whitelist 7020 on or accessible to assembly 702 and/or is found in a whitelist 7016 on or accessible to AFM 795.

In one or more embodiments, the payment platform 704 in FIG. 11 is a central server that performs various calculations. Payment platform 704 advantageously calculates fares, since this is typically where the fare rules reside. Payment platform 704 has access to ridership records and connectivity to the VPN 797, and preferably has access to any additional data needed to determine fares, such as, for example, personal entitlements and/or discounts and/or subsidies associated with the card. Under a different architecture, the functionality of elements 704, 795 could be combined in some instances.

By way of summary and provision of further detail, in many cases, a "transaction" will imply multiple (two or more) presentations of the card or other payment device, such as check-in and check-out, which determine the final fare. However, in some instances, only a single presentation is required, yet certain calculations (e.g., fare discount) may need to be performed to determine the amount due. In other instances, regardless of whether there are one or more presentations, no calculations are needed to determine the amount due.

It should be noted that one or more embodiments are applicable in a transit environment. FIGS. 10 and 11 provide a non-limiting example of one of many possible transit environments in which embodiments of the disclosure might be employed. Furthermore, embodiments of the disclosure can be employed in a variety of contexts besides transit, such as, for example, theme parks, theaters, stadiums or other event venues, museums, festivals, and the like. Indeed, one or more embodiments may be appropriate in scenarios where real-time online authorization is not feasible (whether due to transaction speed constraints or availability of communication constraints, or both). Whitelists could, in some cases, be distributed by occasional/batched communications or even by manual data transfer devices (e.g., portable memory media); thus, some embodiments could possibly be used in connection with vending machines or the like, with limited, or no, network connections. Thus transportation system 280 could also represent a theme park, theater, stadium or other event venue, museum, festival, and the like. In the broadest aspect, the entrance and exit could be the same or different physical locations. Even in a transport system, in some cases, this could be true; for example, a bus could have a single reader, terminal and entrance/exit door.

Leveraging a Network "Positive Card" List to Inform Risk Management Decisions

One or more embodiments advantageously provide techniques for developing a whitelist of cards that a transit operator or the like can utilize to make good decisions about who to let into the system without contacting the issuer. In this regard, as noted, there is a desire to use conventional payment cards for access control to transit systems or the like; however, communicating with the issuer to conduct a full payment authorization process (e.g., ISO 8583 0100 auth request/0110 auth request response) takes too much time, given that a timing target, as noted above, is about 500 msec maximum.

This has been an ongoing problem for many transit agencies; a common issue is how to eliminate "first tap" risk. Consider the first time someone presents a credential to the turnstile (fare gate or the like). If there is some information available about the card, phone, watch, or other payment device—i.e., if the device has been seen before—then it is typically either on a "negative" list (has been declined in past) and so access should not be allowed OR the last time it was presented it was accepted, so that access should be granted. One pertinent problem for a transit agency or the like is a "net new card"—i.e., one they have never seen before or have not seen in a long while. Furthermore in this regard, if the transit agency sees the same card every day at 9:09 AM, the agency knows that the holder is a commuter and the agency learns the commuter's patterns. If the agency only sees the card every four months, then the agency has less insight into the cardholder's payment history. One manner to reduce or eliminate first tap risk from the standpoint of the agency is to undertake certain actions with cryptography. There are, classically, three different processes that can be undertaken for offline data authentication (ODA) depending on the card:

Static data authentication (SDA) ensures data read from the card has been signed by the card issuer. This prevents modification of data.

Dynamic data authentication (DDA) provides protection against modification of data and cloning.

Combined DDA/generate application cryptogram (CDA) combines DDA with the generation of a card's application cryptogram to assure card validity.

For example, at least one major transit agency uses the following methodology. A determination is made whether the presented card is on a current negative list. If this is so, access is denied. Assuming that the card is not on the negative list, a determination is then made whether the card supports a sufficiently strong type of offline authentication; e.g., CDA. If so, and the authentication is completed successfully, grant access. Historically, European cards could carry out such authentication but U.S. cards could not.

In one or more embodiments, an entity such as Mastercard International Incorporated (or another operator of a payment card network which, by way of example, might be an ISO 8583 payment card network) utilizes its data warehouse; advantageously, such warehouses contain a large amount of useful transactional information. The entity provides the transit authority or other putative card acceptor with a "GO" indication (i.e., allow access) or at least a score which allows the transit agency to make a good decision on granting access. For example, the payment card network operator may have noticed that the card was successfully used 4 hours ago to buy a sweater at a local retailer—while not a guarantee that the issuer will approve the current transaction, this knowledge nevertheless gives some indication that the card is likely going to be an acceptable one. In a case where the transit authority has no information on which to base a decision, this knowledge of the previous successful transaction provides at least some valuable insight (at least one additional data point in the transit authority's decision making tree that the transit authority can use to decide whether to open the turnstile).

There are several possible ways to carry this out; for example:

1. On an individual level; i.e., using a specific PAN linked to a specific account, or using a token that links to a specific account (e.g., the aforementioned Mastercard MDES); or
2. At the BIN level or issuer level—in this regard, it is possible to characterize creditworthiness based on issuer, or even by portfolio within an issuer. Some issuers and/or portfolios within issuers, for example, cater to lower, middle, or higher credit scores (e.g., FICO scores) and/or to different types of consumers. A "highly affluent" portfolio may be a good indication that there is a lower chance of a decline for, e.g., a $2.20 U.S. pay-as-you go transit ride. On the other hand, a portfolio that skews more towards underserved individuals, students, sub-prime, or those with a lower credit score, may perhaps have a higher risk.

One or more embodiments advantageously facilitate pay-as-you-go functionality, such as for transit. Consider the frequent long lines that may be encountered to purchase a special closed-loop transit card. Many vending machines are not user-friendly; and lines and/or the need to pre-purchase may involve lengthy time delays and/or other inconvenience. The ability to permit the transit authority or the like to allow access by opening the turnstile or fare gate for a pay-as-you-go transaction with an open loop card or device advantageously reduces the delays and/or inconvenience, in one or more embodiments.

One or more embodiments employ a BIN-level solution.

One or more embodiments provide a solution employing the TMIP 795 (e.g., transit application of a PNIP 2012). For example, in one aspect, the TMIP queries the data warehouse 2062 directly. In another aspect, if direct access is to be avoided due to, e.g., security concerns, data can be stored outside the data warehouse—e.g., a truncated list. In this aspect, the PNIP accesses a locally stored list 7016 of, for example, a BIN range score (a BIN range lookup table is, in itself, known); a "GO" (allow access) or "NO GO" (deny access) by BIN range, or a truncated list of PANs or tokens which the TMIP 795 queries to retrieve the score or GO/NO GO decision. In this aspect, the entity such as the payment card network operator will not only list cards that are "good" but also cards that are "bad." For example, suppose a cardholder recently had several declines or his or her card is on the lost and stolen list. In one or more instances, the payment card network operator periodically updates the lost and stolen list; say, every 4-5 hours. Some embodiments are useful in, say, hour 2 of the standard lost and stolen list update cycle wherein the locally stored list in accordance with one or more embodiments is updated in real time or near real time. In one or more embodiments, the TMIP 795 pings or queries the data warehouse 2062 with some sort of criteria (e.g., a truncated PAN or a full token to search the data in data warehouse 2062 to determine if the card or other device has been seen before, and if so, what the outcome was of the most recent attempted transaction). The TMIP 795 then provides the transit platform 704 with a GO/NO GO decision.

Thus, data warehouse 2062 typically records all transactions in payment card network 2008. In some embodiments, data mining is carried out on that transaction data to develop a characterization or score for individual PANs, yielding, e.g., a list of "good" PANs and optionally a list of "bad" PANS. TMIP 795 in real time or near real time or periodically has connectivity with payment card network 2008 and updates a local copy 7016 of one or both lists so that local terminals (see 702) can query the TMIP on a fast connection when the card or other payment device is presented.

Advantageously, one or more embodiments improve upon prior art PAN-focused techniques by utilizing techniques focused instead on a BIN range; for example, employing one or more BIN range tables. The Mastercard MDES tokenization scheme uses a BIN range table for purposes of indicating whether a corresponding issuer has signed up for tokenization. One or more embodiments make use of the insight that inferences can be drawn as to risk based on BIN. For example, a "high-end" card portfolio linked to an airline may attract affluent people who travel more than the average person and are believed to be a "low" risk. On the other hand, a BIN associated with a starter portfolio (say, young people just entering the workforce getting their first credit cards) may have somewhat more risk than the "low" risk affluent portfolio. The average credit score (e.g., FICO score) of the high-end portfolio is likely to be significantly higher than that of the "starter" portfolio.

One or more embodiments, as noted, make use of the TMIP 795. Aspects of one or more embodiments can advantageously be carried out on the TMIP, which is typically already carrying out risk and/or velocity checks and is already in high-speed communication with the transit platform. In some cases, the TMIP carries out the check via an application programming interface (API) and immediately feeds corresponding data to the transit platform 704, which ultimately makes the decision whether to open the fare gate/turnstile. In one or more embodiments, the TMIP communicates with the AFM platform and queries a global hotlist; if desired, communication can be had with the warehouse 2062. Of course, in one or more embodiments, the AFM runs on the TMIP. Other embodiments can use different approaches to splitting functionality between the TMIP and platform 704. In some cases, the transit platform 704 receives the transaction from the fare gate/turnstile and passes same to the TMIP for scoring and/or a list lookup (e.g., whitelist, blacklist, or "hot" list). The transit platform 704 may also check to determine if a presented device is on the locally-housed negative list of the platform 704. The TMIP undertakes scoring; for example, via a direct connection which bypasses the acquirer for speed. An approval or decline is returned. In some instances, the TMIP will check against a global hotlist and if found thereon, will not send for authorization but will return a decline to the platform 704 (lost/stolen) and the platform in turn will send a decline message to the turnstile. Furthermore with regard to bypassing the acquirer, the transit platform 704 may communicate with the TMIP, which can have a local list not requiring further network access, or, in another aspect, the TMIP can access a central data warehouse such as 2062, but without going through the acquirer.

Aspects of one or more embodiments can also be applied to, for example, private label cards and/or private BINs. For example, suppose it was desired to use a private-label transit card from City A in City B, but the back ends of the transit authorities in City A and City B are currently not in communication. If the closed loop private label card has a PAN or other identifier, it is possible to use it in City B. While City B might not know how much money was on the card, a good record of use in the transit system of City A may make the transit agency of City B comfortable in permitting access and trying to settle funds on the back end.

One or more embodiments, as noted, are BIN-focused rather than PAN-focused. Furthermore, one or more embodiments advantageously address the situation where a presented payment device provides the reader 702 with a token rather than an actual PAN (e.g., where a service such as Mastercard MDES or the like has been employed). In some cases, a payment card network operator such as Mastercard International Incorporated receives a message including the token; the operator recognizes the token and examines the token to determine inclusion on a given BIN list. That BIN list will be pre-characterized based on risk. For example, a given BIN list may have an 80% probability of being approved. In this aspect, without consulting an acquirer, issuer, or any other party, the payment card network operator uses, e.g., discretionary field 58 (or other suitable field) and immediately sends back a message giving the transit authority a "GO" decision. In some cases, this takes place on the TMIP; in others, in central location 2009. Thus, in some instances, the acquirer is not consulted in the decisioning process. In this aspect, there is no consultation with the acquirer or even the issuer before a GO/NO GO score is put on the transaction based solely on the identified BIN and the pre-evaluation that this BIN has a high overall level of approvals. This decision could be sent back to the AFM via the TMIP or it could be a score that is stored on the chip on the card and the card (or mobile device with data storage or the like capabilities) could talk directly to the turnstile in an off-line manner. In one or more embodiments, the payment card network operator works with the transit authority beforehand to map risk characteristics to a "GO/NO-GO" decision. For example, a decision can be made that a "GO" decision will result if the BIN is approved at least some predetermined percentage of the time; e.g., 60%, 70%, or 80% of the time, or some other appropriate value. In this case, for example, if the transit authority wants to allow access only when the approval percentage is greater than or equal to 70%, and the BIN in question only has a 60% approval value, the BIN in question is designated as a "NO-GO." On the other hand, if the BIN in question has an 80% approval value, the BIN in question is designated as a "GO." In one or more embodiments, the payment card network operator builds a BIN algorithm. The individual message that goes back to an individual municipality may be configurable, for example, based on the number, as just illustrated.

Note that the aforementioned EMV® Payment Tokenisation Specification Technical Framework, Version 1.0, March 2014 defines a "Token BIN" as "A specific BIN or range within a BIN that has been designated only for the purpose of issuing Payment Tokens and is flagged accordingly in BIN tables." Further, the aforementioned document defines "Token BIN Range" as "A unique identifier that consists of the leading 6 to 12 digits of the Token BIN. The Token BIN Range may be designed to carry the same attributes as the associated card issuer card range and will be included in the BIN routing table distributed to the participating Acquirers and Merchants to support routing decisions." The terms "Token BIN" and "Token BIN Range" are used herein in their ordinary sense as would be understood by the skilled artisan.

In one or more embodiments, the BIN algorithm and the like reside on the payment card network operator's systems; the operator can, if desired, host the BIN list. In an alternative approach, the BIN list is hosted by the municipality. As noted, in one or more embodiments, the payment card network operator works with the transit agency to determine the desired threshold and provides a "GO/NO-GO" based on the known percentage approval for the particular BIN and a pre-configured threshold. It is worth noting that this decision is not the same thing as a payment card authorization request and authorization request response (e.g., ISO 8583 0100/0110 or equivalent in other systems) since, inter alia, there is no guarantee of payment. Rather, based on the BIN the particular token is part of, there is X % likelihood of payment, which is either acceptable "GO" or unacceptable "NO-GO."

Thus, it will be appreciated that one or more embodiments improve prior art techniques by permitting the use of a "whitelist" based on previous transactions in the case of a payment device that passes a token to the reader at the fare gate, rather than an actual PAN (e.g., a MasterPass-enabled device). One or more embodiments provide a mechanism, without requiring a full auth request and auth request response (which takes too much time), to provide better decisioning using data on a BIN range.

In one or more embodiments, the TMIP 795 quickly passes the data to the payment card network operator 2008 and then back to the transit agency. The payment card network operator can maintain or develop a list that resides at central location 2009 and/or locally at 7016 and/or 7020; updates to locations 7016, 7020 could be batched, real-time, or near-real-time, for BIN-based decisioning, even when the card number is tokenized, in less than 500 msec.

Aspects of the disclosure can also be useful in the case when an individual has two payment devices; e.g., two smart phones, one for business and one for personal. Suppose this individual pays for a transit ride in the morning using the personal phone and in the afternoon using the business phone. This individual appears to the transit authority to be two different people. However, from a risk management perspective, there is most likely the same underlying PAN (say, the same Mastercard account linked to both phones). It will be desirable for the transit authority to appreciate that, from a risk management perspective, the risk parameters are similar for the two "people" (who are in fact only a single person).

By way of review, one or more embodiments of the disclosure are useful in timing-critical environments, such as transit, where a "GO-NO GO" decision must be made rapidly, without time to undertake a full authorization request and authorization request response to and from the payment device issuer. As noted, transit has strict timing requirements, on the order of 500 msec, and it is not feasible to carry out a real-time authorization request and authorization request response in the available time.

Meanwhile, there is a trend to using tokenization for electronic devices such as smart phones and the like used in lieu of payment cards, wherein the token on the device and the funding PAN are decoupled by design (e.g., Mastercard MDES system). That is to say, the merchant is only provided with the token, but it is not desired to allow the merchant to have the funding PAN as well. This leads to certain challenges. The above-mentioned EMVCo has been working for several years on the PAR (payment account reference number). The PAR Data is made up of 29 characters and includes a 4 character value that EMVCo assigns as the BIN Controller Identifier and a 25 character unique value that is generated and assigned in accordance with the governance of the BIN Controller. The PAR Data is not an ISO-compliant 16-digit PAN number. By default, if a PAR number is stolen, nothing can be done with it. It cannot be used on a debit or credit card, and is unreadable by today's technology. Thus, one exemplary solution for transit or similar applications is as follows. Suppose someone is using a digital wallet such as Mastercard MASTERPASS®, APPLE PAY® (registered mark of Apple Inc., Cupertino, Calif., USA), Android Pay (digital wallet platform developed by Google Inc. Mountain View, Calif., USA), or Microsoft Wallet (mobile payment and digital wallet service by Microsoft Corporation, Redmond, Wash., USA that lets users make payments and store loyalty cards on certain devices) on his or her smart phone (e.g., iPhone, Android, or other appropriate phone brand/operating system as the case may be). One or more embodiments can be implemented regardless of the type of phone used. Embodiments can be, for example, secure elements (SE)-based or cloud-based. In one or more embodiments, the token is passed with the PAR. The transit agency stores the PAR and uses it as a reference. The transit agency does not need to store the FPANs (funding PANs). One pertinent aspect of PAR is to remove the requirement to pass the PAN back.

If someone loses his or her phone, or deletes the token off of his or her phone and then re-tokenizes the phone, the PAR is nevertheless static and remains connected to the account. For example, suppose the issuing bank is "BANK A." The PAR is tied to the individual's credit account (ISO-compliant PAN) or DDA number (string of numbers used by the U.S. banking system). While this is useful, there still remains the problem of verifying that the person has money in the bank. This leads to the idea of a whitelist. In one or more embodiments, however, instead of drilling down to the FPAN level, the focus is on a token BIN range. Current thinking is that it is undesirable for transit authorities or merchants to store or house FPANs or even have them in a computer system (payment card network operators and issuers will still need to access FPANs). In an FPAN-based approach, a determination could be made whether the individual subject had recently transacted successfully with the card and/or has a good payment history. On the other hand, one or more embodiments use a token BIN range. In embodiments, this range is assigned to a single issuer for their purposes. A score is developed based on the people within that token BIN range. In some instances, a token BIN range may cross portfolios within, e.g., BANK A. This can be at the discretion of the issuer. In one or more embodiments, however, portfolios with significantly different risks are provided with different token BIN ranges. For example, a card portfolio co-branded with an airline may attract affluent people and have a relatively low credit risk, while an ordinary card portfolio may have a medium of average credit risk.

In one or more embodiments, consider that there may be multiple thousands of individuals who all have the "BANK A Gold Card." Each individual in that portfolio will have a credit (e.g., FICO) score and a payment history. An aggregate score can be made for the group as a whole; say, for example, on a scale of 1-5 or 1-20, or other desired scale. The BIN as a whole is then declared "more risky" or "less risky." Because there are many fewer BIN ranges than there are FPANs or PANs, the BIN range and associated score can be housed locally at the back end of the transit agency (by way of example and not limitation on or accessible to a TMIP 795 or the like, as seen at 7016, or even locally at the turnstiles 702, as seen at 7020). When a chip card is tapped (e.g., a single (contactless) or dual (contact and contactless) interface chip product), or a watch, phone, or other chip-enabled device is presented, at that point, the card or phone immediately presents the DPAN (device PAN/token PAN) which is matched up to a risk-management scoring methodology whitelist which the transit agency can use as an additional security/risk management check. The transit agency can see, for example, that the average score from the BIN range in question is medium; e.g., 3 on a scale of 1 to 5. The transit agency then uses that score to determine if it is desired to allow the person through the fare gate. Alternatively, suppose, for example, that the average score from a BIN range in question is low; e.g., 1 on a scale of 1 to 5. The transit agency then uses that score to determine that it is not desired to allow the person through the fare gate/turnstile, and declines right at the fare gate/turnstile. No authorization to the issuer is needed; rather, the transit agency merely communicates with its own back office or possibly merely makes the entire determination right at the fare gate/turnstile, as at 7020, since a BIN-based whitelist takes up limited memory and could be held in the memory of the fare gate/turnstile 702. In another example, suppose that the average score from a BIN range in question is high; e.g., 5 on a scale of 1 to 5; the transit agency now knows that there is little risk of non-payment from this particular device/token PAN range.

One or more embodiments thus whitelist based on a token BIN range representing one or more portfolios of an individual issuer.

Within a BIN range, not everyone will be using an electronic wallet or the like. Those who are using such solutions are already a sub-segment of a portfolio which can be scored against a wider portfolio. Those within a portfolio that use an electronic wallet and have a DPAN may act differently than those within that portfolio who do not have a DPAN. Consider, e.g., an individual with an 800 FICO score—such an individual is very likely to pay his or her bills. On the other hand, an individual with a FICO score of 550 may be much less likely to pay. Consider further, however, that even in a portfolio which tends to the sub-660 FICO range, those who use their phones for payment may have a different portfolio profile or may have a higher chance of paying, due to being more technologically savvy. Data mining could be carried out to verify this supposition. In one or more embodiments, segmentation can be done within the BIN range. Of course, segmenting within a BIN range by token or PAN, would result in a larger whitelist than one based on a BIN range only. In one sense, there is a self-segmenting aspect, as you can tell when someone presents a tokenized phone that he or she already falls within the sub-group of the BIN that takes advantage of tokenization and may therefore be inferred as "technologically savvy." For example, perhaps a BIN with an average 550 FICO score has a 60% chance of paying but those in the BIN who have wallets on their phones and are more technically savvy can perhaps be shown to have a 70% chance of paying. IN this aspect, consider 70% not 60% when deciding whether that BIN range is good in embodiments that are inherently only available to people using an e-wallet. On the other hand, if looking solely at token BIN ranges, everyone typically has a token and thus a smart phone or the like.

In some instances, the sub-segmenting could lead to a "score plus one" aspect where the base score is the same for everyone in the BIN but those individuals who are in the BIN yet pay in a certain way are assigned a weighted score. In this manner, the whitelist is still assigning a rating to a group of people—not individuals—but based on the technology those individuals use they could receive a different (e.g., slightly better) score. Furthermore, within a token BIN range, in some instances, frequency of payment can be taken as the "plus one" mentioned above. The token BIN range is all the same, yet those who are "heavy users" have a better score than everyone else on the assumption they are even more technologically savvy.

In some instances, whitelists including Token BIN ranges, PARs, and/or FPAN BIN ranges can advantageously be loaded locally on the turnstiles as at 7020. Note, however, that where turnstiles are memory-constrained, whitelists based on BIN ranges, rather than individual PANs or other individualized characterizations, take less memory space and will be preferred. In this regard, turnstiles have internal memory and are typically uniquely identified. One or more transit authorities in Europe currently take two actions right at the turnstile:

1. Check whether card/device is on a negative list, in which case turnstile does not open; and/or
2. See whether card/device supports ODA, because if it does not, the turnstile will also not be opened—the card/device holder will be directed to a ticket vending machine or a staffed ticket booth, to buy a ticket.

Again, the token BIN range table and/or score can be locally loaded onto a turnstile, in one or more embodiments.

In some embodiments, a net new field of information is passed in the data that flows from the payment device itself (e.g., a payment-enabled cell phone, such an iPhone with a suitable chip (e.g., NXP), or other devices as described herein) to the turnstile. The turnstile then uses that data to make a decision. The new data can include the score and/or BIN range. Thus, some embodiments rely on having the payment device pass some additional data to the reader on the turnstile. On the other hand, in another aspect, the DPAN itself is automatically passed and the DPAN score is passed to the acquirer who then passes it to the transit agency. The payment card network operator can also have a direct link to a transit agency where the payment card network operator provides the transit agency with the DPAN range scores. There are a variety of ways to pass the data; in one or more embodiments, the transit agency has the DPAN BIN range and the corresponding score for that range. In another aspect, the payment card network operator provides this information to the system integrator and the system integrator puts the information onto the turnstiles; or the payment card network operator provides this information to the acquirer and the acquirer passes it to the merchant.

In some instances, the payment card network operator carries out the calculations under the direction of the transit agency. For example, suppose the BIN ranges are broken up into deciles; the payment card network operator works with the transit agency to decide which deciles are "GO" and which are "NO GO" and then just sends the transit agency a list. Thus, in one or more embodiments, the process can be customized based on the transit agency's needs. Some agencies may have different demographics and may be more tolerant of a lower range (e.g., depending on the constituents who live in a certain city).

Consider a use case wherein a person with an electronic wallet enabled phone is in City E and wants to travel on City E Transit to Station 3. He or she approaches the turnstile. He or she opens his or her electronic wallet app, if not already open. He or she selects the desired payment option stored in the wallet (unless there is a pre-defined default option that it is desired to use). He or she authenticates himself or herself to the device using a personal identification number (PIN), via biometrics, or using some other suitable technique. He or she taps his or her phone on the turnstile, or otherwise presents his or her phone to the reader in the turnstile. Rapidly (in a non-limiting example, in about 50 msec), appropriate data passes from the phone to the turnstile. Depending on the particular embodiment, either the score and/or GO-NO GO indicator is passed along with the DPAN or the DPAN is passed to the turnstile without the score and/or GO-NO GO indicator. The turnstile opens within 500 msec unless something happens to suggest that it should not.

In this regard, as will be appreciated by the skilled artisan, a device PAN or DPAN identifies a particular device, e.g., a phone. It is, in essence, a token, what the abovementioned MDES or similar service will digitize onto the phone. The DPAN is not the device ID—all devices also have a device ID. Reference is made to the aforementioned EMV® Payment Tokenisation Specification Technical Framework, Version 1.0, March 2014. Page 13 of that document notes that Payment Tokens can take on a variety of formats across the payments industry, and that for the aforementioned specification, the term Payment Token refers to a surrogate value for a PAN that is a 13 to 19-digit numeric value that must pass basic validation rules of an account number, including the Luhn check digit. The document further notes that Payment Tokens are generated within a BIN range that has been designated as a Token BIN Range and flagged accordingly in all appropriate BIN tables, and that Payment Tokens must not have the same value as or conflict with a real PAN. Tokens used with one or more embodiments may, but need not, conform to the specification? EMV® Payment Tokenisation Specification 6.2.4 explains how device ID can be used and page 46 thereof addresses token location information (e.g., for a token residing on a device). Page 68 thereof notes that the Token Cryptogram generated from the mobile device along with POS Entry Mode will serve as the Domain Restriction Control fields that will be used by the Token Service Provider to validate the integrity of the transaction using that Payment Token.

The payment card network operator, in relation with the issuer, can match up the DPAN with the actual underlying PAN, but others cannot do this. Suppose someone desires to tokenize something into his or her iPhone® or other smart phone. He or she makes a request of his or her bank. Suppose he or she wants to put his or her "BANK Y" card into a mobile wallet app. Apple (in the case of the iPhone and Apple Pay or other entity in the case of a different type of phone/app) and BANK Y have a pre-existing relationship wherein Apple lets BANK Y add cards onto its wallet. BANK Y sends a request to Apple indicating, e.g., that Joe Smith wants to put his BANK Y Travel Points card into Apple Pay. Apple contacts the payment card network operator and asks for a token; the token service provider (which is the payment card network operator in the following example, but in general, may be a separate entity) has the token vault, generates the token, and is capable of doing the mapping. Reference is made to EMV® Payment Tokenisation Specification Technical Framework, Version 1.0, March 2014 FIG. 1 page 23 and accompanying text (Payment Token Provisioning Overview) and to FIG. 2 page 24 and accompanying text (Payment Token Transaction Overview). Apple sends the payment card network operator the BANK Y information and the payment card network operator sends Apple back the token. Apple desires only the token, not the FPAN. Thus, a card is put into Apple Pay—it looks like a BANK Y card; however, the number Apple actually stores in their system is simply a token (a reference number). If, for example, someone uses Apple Pay at STORE G, the request is routed through the payment card network operator, who can "de-tokenize" it. The payment card network operator knows what the FPAN is. The payment card network operator asks BANK Y whether Joe Smith has any money/open to buy balance in his account. BANK Y presumably replies in the affirmative. The payment card network operator then relays an approval to STORE G. However, STORE G does not receive the FPAN in the response, merely the token.

In this regard, the FPAN (funding PAN) is the conventional PAN associated with the underlying account. The issuer generates the FPAN and links it to the subject personally (personally identifiable information, or PII, should be handled in accordance with applicable rules—see above discussion of encryption and PCI-sensitive data). So, suppose an individual has a wallet app on his or her phone and a token which is not an actual PAN. Normally, when he or she desires to carry out a conventional transaction, the payment card network operator can map it to the actual PAN using, for example, techniques such as are discussed in the EMV® Payment Tokenisation Specification Technical Framework, Version 1.0, March 2014 reference, and can then send the actual PAN off to the issuer. The issuer says yes or no (i.e., returns a conventional authorization request response), replies to the payment card network operator, and the payment card network operator passes the decision back to the merchant without identifying the actual PAN. However, in one or more embodiments, because of the transaction-time criticality of transit or the like, the issuer is not contacted for decision purposes. Instead, a token BIN range is populated onto a list. In one or more embodiments, appropriate rules specify that an issuer cannot mix token PANs and FPANs within the same BIN range so that a token BIN range is "clean"

Suppose BANK Y knows that their Travel Points portfolio is token BIN range 123 through 456. When BANK Y initially issues a card, if it has initially been requested to be put into Masterpass or a similar electronic wallet such as Apple Pay, Android Pay, or the like, the score can be appended to the token. The issuer knows the card and portfolio and/or the network operator can carry out scoring based on transaction data in the warehouse 2062. For example, it is known that the token BIN range that BANK Y needs for a portfolio has a "4" and that "4" is added to the actual token. In another aspect, the payment card network operator houses the BIN range, and sends an encrypted file to the transit agency or the like saying "this BIN range is a '4' " and the agency enters that information into its back office host platform system and/or pushes it out to the turnstiles or bus fare boxes. The turnstiles or bus fare boxes may have, e.g., BIN range 123-456="4" or BIN range 123-456="Yes (GO)" or "No (NO-GO)." The payment card network operator can provide a BIN range to a transit agency or can do so via an acquirer or systems integrator. For example, the payment card network operator can house a BIN range look up in a transit-specific PNIP such as a TMIP or the like, or the transit agency can build a BIN/portfolio indicator/portfolio score mapping into the transit platform. The transit agency can also obtain a BIN range from its acquirer, possibly for a fee paid to the acquirer.

Thus, in some instances, the payment card network operator works with the transit agency, understands the agency's risk tolerance, and determine which BIN ranges are "GO" and which are "NO-GO" and just provides GO/NO-GO per BIN range to the transit agency. Alternatively, calculations can be done at the transit agency, or some calculations can be done by the payment card network operator and some by the transit agency.

In one or more embodiments, BIN range scores are periodically re-calculated. For example, every quarter, month, half year, or year, re-calculate the scores. Portfolios can get more or less risky over time. If a "4" (already acceptable) improves to a "5," no change may be needed. However, suppose a "4" or "5" drops to a "2" or "3"—that portfolio may change from a "GO" to a "NO GO/do not honor." Also, the converse is true—if the score improves, the portfolio may move from a "NO GO/do not honor" to "GO." The rating may be sent to the phone or through the back end, for example. In the latter case, the turnstile receives the token on payment device presentation to make the decision locally.

One or more embodiments employ a tokenization service, such as the MDES tokenization service, which digitizes and tokenizes a PAN. The tokenization service acts as a TSM (trusted service manager) and a TSP (trusted service provider). The entity providing the tokenization service ("token service provider" may be, but need not be, a payment card network operator) generates the number in the token vault and also provides an "on-behalf-of" service as a TSP, where the number is pushed to the phone. Reference is again made to EMV® Payment Tokenisation Specification Technical Framework, Version 1.0, March 2014 FIG. 1 page 23 and accompanying text (Payment Token Provisioning Overview) and to FIG. 2 page 24 and accompanying text (Payment Token Transaction Overview). One or more embodiments can employ similar provisioning techniques for pushing a token to a smart phone or the like, except that one or more embodiments push a modified token containing data on Token BIN scoring and/or push a data item containing data on Token BIN scoring along with the token.

In some instances, instead of passing an additional data item from the phone to the reader, the token identifies itself as being part of, e.g., a "4" BIN range, by adding an additional data element to the regular transaction stream.

It is worth noting that some transit authorities are "tap in only" (e.g., New York's MTA); while some are "tap in-tap out" (e.g., Transport for London (TfL), Wash., D.C. Metro). There is a concern for potential fraud because tokens change. An individual can delete a token and then obtain a new token. The transit authority will see this as a net new person; like getting a new card. With a new card an individual can present same to the transit authority for the first time and may be allowed in initially based on fraud risk algorithms without an authentication request and response to/from the issuer. Refer to co-assigned U.S. Pat. No. 7,828,204 (mentioned above); U.S. Pat. No. 8,584,936 (mentioned above); and U.S. Pat. No. 8,556,170 of Sara Fiebiger et al. the complete disclosures of which are expressly incorporated by reference herein in their entireties for all purposes. The person then taps out. The back end calculates the fare; and carries out a full auth request and response to/from the issuer. If the authentication request response is affirmative, fine; if not, add the card/device to the so-called blacklist or negative list. Challenges arise when you are using tokens instead of an actual card. Consider a tap-in only scenario. The user taps in and the gate opens in 500 msec based on a new token on the phone. There is no tapping out. In the meantime, the user walks through the gate. The transit authority goes to the issuer and the authentication is declined. A criminal subject deletes token and re-provisions a new token. An unscrupulous person can do this as long as he or she can get new tokens. He or she might get, e.g., 20 free rides before it is determined that he or she is deleting and re-tokenizing, say, twice per day.

Suppose an individual keeps $1.50 in his or her account for one month (an amount less than the threshold fare). In one or more embodiments, a rule is established denying re-tokenization if the account balance is less than the threshold fare. This is one reason why PAR was created—another number that is a reference number to the account. PAR is global and to be compliant with European privacy law, PAR is at the account level, not at the funding PAN level. This works acceptably if an individual is part of a bank and it is his or her credit card or debit card and his or her account is not "householded." In the case of "householding," however, the individual is treated as a unit with his or her spouse yet has two different kinds of account numbers. In some instances, in both a debit and credit card scenario, the cards may have the same number in a householded issuer account; however, as noted, they may also have a sequence number which would identify one card from the other. In some instances, a secondary card has a different FPAN/a different account. In banks that household, individuals might have the same account number and FPAN on their debit cards. This can lead to problems because of two people sharing one monthly pass, one weekly pass, or the like. In particular, suppose people are using a card form factor on the turnstile—problems may arise since the FPAN presented will be the same whether or not it is the first or second family member, so the transit agency may allow both members to ride if there is a monthly pass that is associated to that card. That is to say, that particular FPAN purchased a monthly pass so that FPAN on the transit agency's back end is now associated with a monthly pass. However, there are some velocity checks that some transit agencies do employ to prevent the same FPAN being used within a certain amount of time, or geographic distance, or the like, to try to reduce the potential for this kind of misconduct. The PAR can help to address this situation. The PAR has the ability to include a sequence number (card 1, card 2 . . . ) to acknowledge presence of multiple cards on the account, e.g., husband, wife, child. However, all banks do not necessarily code to the sequence number, and the sequence number is not necessarily mandated.

Furthermore in this regard, in the case of a householded card within a mobile device, the data that is passed includes the DPAN (token) and optionally the PAR with sequence number. One issue with devices is that a card can actually be placed on multiple devices; e.g., phone, watch, tablet, etc. In current schemes, each device will have a different token even though the underlying card is the same on the two (or more) different devices. If a householded card buys a monthly pass, most transit agencies will honor the first device to show up. Since a payment card network operator will send back a truncated FPAN with the transaction, the agency will be able to tell that a monthly pass was purchased with that card, and so, they will associate the monthly pass to the token that was just presented. In this aspect, a first family member could purchase a monthly pass, but if a second family members presents a device to the turnstile first, the monthly pass will be associated to the second family member's token not the first family member's.

If a locally generated score is employed, the token BIN range will not necessarily change; even if an individual tries to game the system by, e.g., repeatedly de-tokenizing and re-tokenizing, in theory, the token BIN range is the same and the individual will show up as, e.g., 3, 4, or 5. Of course, the individual may personally be a 2 in a token BIN range that is more of a 4 or a 5, but at least the transit agency is provided with some level of safety. In theory, in a 5 token BIN range, an individual may be more affluent and possibly less likely to try and game the system. In general, even though there may be a few more risky individuals within a higher-rated portfolio, the portfolio score should help give another data point that the agency can use to generalize the probability that the consumer is a "good bet" to allow into the system.

As an aside, it is worth noting that many ticket vending machines are very old such that replacement parts are no longer manufactured, and it is thus desirable to enable the use of general-purpose open loop payment cards or wallet-enabled smart phones or the like.

It is worth noting that in some current transit approaches, tokenization rules for transit allow the issuer and acquirer to pass back the PAN or a truncated PAN to the transit agency. Note that when PAR is functional this passing back of the PAN or a portion thereof will likely no longer be needed. This permits the transit agency to have a view into the passenger's journey history; to be aware that the passenger purchased, for example, a monthly pass (e.g., on-line using an actual card number), and so on. The transit authority system will typically not retain the FPAN, but will use the FPAN only to ascertain that the account corresponding to the presented token has purchased a monthly pass, with a notation made in a database to identify the presented token as having purchased a monthly pass. A check can be made on a monthly (or other periodic) basis.

In a non-limiting exemplary use case, suppose an individual resides in the U.S. and has built up a record of payment card transactions using, e.g., a payment card account tokenized onto a smart phone. This individual now travels to Europe and seeks to ride on a public transit system using his or her phone. In one option, he or she presents his or her phone and the token is passed to the turnstile reader; the token itself contains information such as a risk profile, decile of credit rating, GO/NO-GO, or the like. In another aspect, he or she presents his or her phone and a data item in the token allows the transit authority to carry out a lookup. A further aspect is similar except that a different data element with the desired information is passed in the course of the phone-reader interaction (i.e., the information is in this different data element and not in the token itself). In an even further aspect, no additional data passes from the phone to the reader; however, the transit authority is provided with some information that allows the authority to carry out a quick lookup. In some cases, a transit authority can undertake a quick Offline Data Authentication (ODA) check to make sure that the card is not a counterfeit product.

The transit authority or a systems integrator working with them can be provided with a list of token BIN ranges. This list need not necessarily identify the issuer. There are certain digits in the token that indicate, e.g., that this token is linked to a "BANK Y Titanium Rewards" card. Certain issuers are assigned certain BIN ranges. A quick reference number is needed for marketing communications. Everyone on the BANK Y Titanium Rewards card should have the same BIN. The transit authority just needs to look up the score for that BIN range.

Thus, in one or more embodiments, the transit authority obtains the token—they do not have the PAN, nor do they have the BIN that is in the PAN. The token BIN is what is passed and the transit authority has the scored token BIN ranges. In a non-limiting exemplary embodiment, the token is a "fake" 16 digit number. Other embodiments could use tokens of a different length; for example, 13-19 digits or 16-19 digits. Reference is made to the aforementioned EMV® Payment Tokenisation Specification Technical Framework," Version 1.0, March 2014 Table 1-3: Definitions. Of course, a payment card network operator might have its own specific implementation of EMV Tokenization or the like. The transit authority looks at the first, e.g., 6 digits and finds the score for the corresponding token BIN range (token BIN range is defined in the specification as a unique identifier that consists of the leading 6 to 12 digits of the Token BIN). The token looks like a regular card number, even though it is not; however, it has in common with the regular card number that the first, e.g., 6 digits (or, e.g., 6-12) are the BIN. In some instances, the BIN range is the first 6 digits but in position 7, 8 or 9 the portfolio identifier is present.

In one or more embodiments, when the token is provided to the device, credit modeling can be carried out contemporaneously, and the results encoded into the token itself or in a separate data element written to the phone at the same time as the token. In the last option mentioned above (where no additional data passes from the phone to the reader), merely write the token on the phone and provide the list to the transit authority. There can also be credit rating and/or propensity modeling calculations in, e.g., a first jurisdiction or location, with the transit authority in, e.g., a second jurisdiction or location.

In one or more embodiments, to determine what BIN ranges have a good credit rating, a scoring methodology is employed; it can be customized, as appropriate. Consider an open loop transit agency, wherein any desired card can be used at the ticket vending machine, turnstile, or fare box. Suppose further that this agency is not EMV-compliant. Even further, suppose that this transit agency encountered difficulty in getting their turnstiles to accept smart phone payments, and that they do not block devices which are not capable of ODA (typical for many U.S. transit agencies). An immediate lookup based on BIN range score could be very helpful in such a scenario. Embodiments of the disclosure thus provide an additional risk management parameter that could be used in the absence of ODA to make, or assist in making, the access decision.

It is worth noting that at least some aspects of the disclosure relate to payment cards as compared to smart phones, making use of the fact that a card chipset such as the M/Chip Advance chipset has read/write capability. For example, some embodiments write a score into the chip that characterizes the risk associated with the BIN. Note that currently, smart phones by default are not contact. While it is easy to carry out read/write (R/W) operations on a contact chip, contactless devices may be ripped out of the field before R/W is complete. Of course, phones and other contactless form factors can be employed with suitable protection against premature removal from the field. At least a portion of this aspect relates to a token PAN as opposed to an FPAN. If a portfolio changes its rating, a new number can be written onto the card itself during a contact transaction at the ticket vending machine. Some transit agencies require accessing the ticket vending machine every ten (or other predetermined number of) trips to update the counters on the card; e.g., in the case of a private label card. Even in locations supporting ODA, an indefinite number of offline transactions are not permitted; it is required to go online periodically. Currently, in the United Kingdom, chip cards function in this manner —the holder must periodically go online and carry out a full "chip and PIN" every 7-15 transactions. This resets the transaction counters, ensures that the card is not lost or stolen, and verifies that the bearer knows the PIN, thus providing another layer of security.

Consider that a transit authority might put a dual interface M/Chip Advance or similar chip on its private label card. Suppose that part of the authority's portfolio is a private label card. The authority might force people to go to the ticket vending machine every certain number of tries (e.g., 10 or other appropriate pre-determined number). They could utilize risk parameters and scoring. The authority may provide a card usable in the transit system that has an open loop portion. For example, there might be a hybrid card with a transit-specific purse and a generally loadable prepaid option usable in the general-purpose payment card infrastructure. This implies that the cardholder must go through the "know your customer" (KYC) process and any other applicable laws and regulations in particular jurisdictions. This results in a hybrid card. In such a case, the transit vendor may not have access to the general payment card infrastructure transactions, only the transactions with the transit specific purse. The payment card network operator, acquirer, and issuer would be the parties handling the general payment card infrastructure transactions. In this aspect, with such a hybrid card, the general payment card infrastructure side could be scored and the score written into the memory of the card's chip; for example, using integrated data storage on the M/Chip advance chip. A BIN is scored and the score is loaded as a risk management tool onto one of the Operator IDs of the chip card. With integrated data storage, for either a private label card or an open loop (if the issuer so chooses), an Operator ID that contains the BIN score can be placed on-chip (it is even possible to note that the card can be used at the MTA or other pertinent transit authority and/or to utilize other data elements). A periodic read/write back onto the card can be undertaken if the score has changed. This aspect relates to a card-centric approach as opposed to a phone-centric approach, although it can be employed with a phone having suitable chip R/W capability. In this aspect, a score is placed right on the payment device and the turnstile can read the score and make a decision locally. In a chip card, the score is loaded onto an open writeable location on the chip. Chips typically have integrated data storage. The score may change over time and can be updated on the card. For example, the issuer may pass back an updated score.

Reference is made to Michael J. Cowen, METHOD, APPARATUS, AND COMPUTER PROGRAM PRODUCT FOR TOPPING UP PREPAID PAYMENT CARDS FOR OFFLINE USE, U.S. Pat. No. 8,341,084, hereby expressly incorporated by reference herein in its entirety for all purposes. Reference is also made to co-assigned U.S. Patent Application Publication 2016-0148195 of Marina ACOSTA, entitled "METHOD AND SYSTEM FOR HYBRID TRANSPORTATION-ENABLED PAYMENT CARD," also hereby expressly incorporated by reference herein in its entirety for all purposes.

Aspects of one or more embodiments of the present disclosure relate to risk management as it relates to access; e.g., mitigating the risk of giving a passenger access to a transit system. Many transit authorities like the model of a transit account funded by an underlying conventional card account, wherein the user registers the conventional card on a web site and the transit authority links it to the user's transit account. Then, the card (e.g., contactless-enabled), phone, or other device is used for access. The transit authority can see on the back end host system that, e.g., the person bought a monthly pass, so do not charge single fare; or may see that the person did not renew their monthly pass and so should be charged for a single fare.

In one or more embodiments, an entity such as a payment card network operator works with the transit authority to determine a desired threshold and then provides a GO/NO-GO decision based on a known percentage approval. The network operator may, for example, work with the transit authority to determine the authority's risk tolerance and then place a GO/NO-GO in the token or in a related data element, or send the transit authority a GO/NO-GO list (as opposed to the decile or credit score).

In another aspect, within a certain token PAN range, it may be desired that a certain predetermined percentage of transactions be historically approved (e.g., 75% or other appropriate value). For example, the payment card network operator may work with the transit agency and say, e.g., based on our experience we predict people in Group A will pay 99% of the time; people in Group B will pay 80% of the time, etc. The transit authority can decide what to do; they may, for example, decide to be more flexible (i.e., accept a lower rating) with a single fare subway ride than with a more expensive suburban train ride.

As discussed above, one or more aspects are helpful where an individual has two different smart phones. The above-mentioned PAR addresses this aspect in one or more embodiments. Note that use of PAR is optional. Suppose an individual has a token on an iPhone and a token on an Android phone. These tokens are two different numbers; however, they still refer to the same person and perhaps also to her or his underlying credit or debit card account. However, the transit authority does not necessarily know this, because all the transit authority sees is the token. The transit authority sees two different tokens; they may never have seen either one before. Suppose BIN scoring is undertaken from a risk perspective. The PAR can address this aspect to some extent; however, consider the situation if the individual is householded. For example, suppose Person A has two different phones and Person A's spouse Person B has two different phones; now the transit authority sees four different people instead of only two. In one or more embodiments, append a truncated PAN or a BIN range to the phone itself—this is similar to the concept of PAR. By identifying that two phones are linked, the transit authority can understand, in the back end, that the two tokens are linked. This could be done, e.g., with a PAR, a truncated PAN, or the like.

Recapitulation

Figure 12:
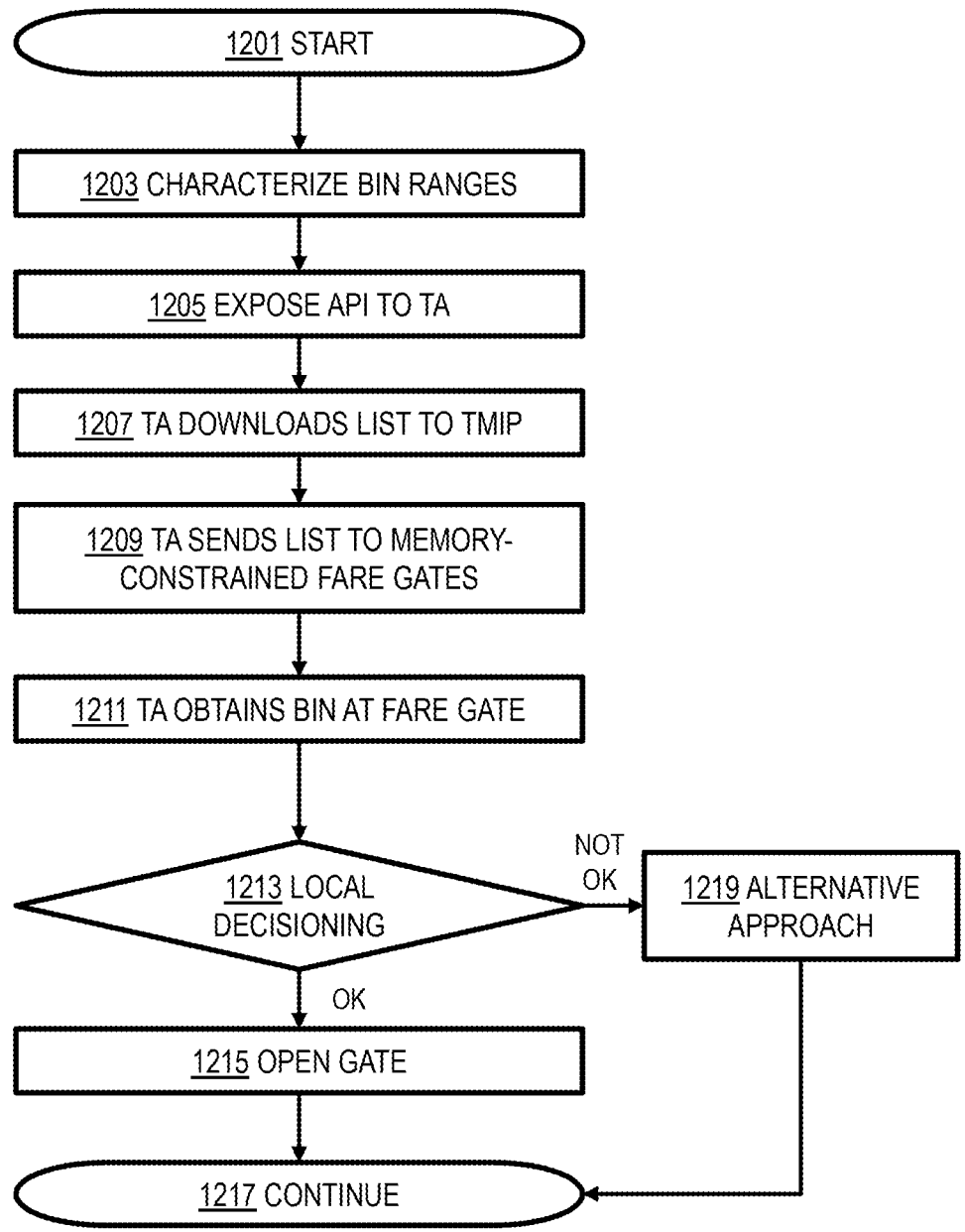
FIG. 12 is a flow chart of an exemplary method according to an aspect of the present disclosure.

Given the discussion thus far, and with reference to the flow chart of FIG. 12 which begins at 1201, it will be appreciated that, in general terms, an exemplary method, according to an aspect of the invention, includes the step 1203 of characterizing a plurality of BIN ranges according to credit risk. The characterizing can be done, for example, at a centralized location such as 2009 by data mining a data warehouse 2062, and/or in collaboration with one or more issuers. The method further includes making available, to a transit-specific payment network interface processor 795 coupled to a plurality of memory-constrained fare gates 702 of a transit authority, a list of the plurality of BIN ranges characterized by credit risk (e.g., step 1205, exposing API). The list is configured to be distributed to the memory-constrained fare gates of the transit authority. These steps can be implemented, for example, by an operator of a payment card network, working in conjunction with one or more issuers and interfacing with a transit agency. A memory-constrained fare gate has adequate memory (e.g., RAM) to hold the BIN-based list in memory 7020 for decisioning access within a predetermined time (e.g., no more than 500 msec) but does not have adequate memory to hold a list based on individual accounts.

In some instances, the list is generated by providing a GO-NO GO indicator for each of the bank identification number (BIN) ranges.

In some such cases, the characterizing step includes breaking the credit risk into predetermined percentiles and designating percentiles above a certain score as GO and percentiles below a certain score as NO GO. In one or more embodiments, this can further involve receiving input from a transit authority about their risk tolerance, possibly based on the nature or type of the transit service. For example, an agency may be more risk tolerant as to a single subway ride as opposed to bike sharing, because of the risk of someone utilizing and/or retaining a rented bicycle in an unauthorized manner.

In some instances, the list is generated by providing a score for each of the BIN ranges.

In some instances, at least a portion of the plurality of BIN ranges are periodically re-characterized according to credit risk; and, an updated list of the plurality of BIN ranges characterized by credit risk, based on the periodic re-characterization, is made available, to the transit-specific payment network interface processor.

In some instances, in the step of making the list available, the transit-specific payment network interface processor is controlled by an acquirer of the transit authority.

In some embodiments, the step of making the list available includes exposing, to the transit-specific payment network interface processor, an application program interface to a centralized data warehouse of a payment card network operator, wherein the list resides. In this aspect, the transit-specific payment network interface processor directly accesses the centralized data warehouse 2062 directly via the API without going through an acquirer for decisioning. Thus, acquirer 793 is not involved in some embodiments. Unit 795 may be on the premises of the transit authority.

In one or more embodiments, the bank identification number (BIN) ranges are token BIN ranges. Token BIN ranges are defined in the aforementioned EMV® Payment Tokenisation Specification Technical Framework, Version 1.0, March 2014 as a unique identifier that includes the leading 6 to 12 digits of the Token BIN. The Token BIN Range may be designed to carry the same attributes as the associated card issuer card range and will be included in the BIN routing table distributed to the participating Acquirers and Merchants to support routing decisions. A token BIN is a specific BIN or range within a BIN that has been designated only for the purpose of issuing Payment Tokens and is flagged accordingly in BIN tables. As used herein, a Payment Token refers to a surrogate value for a PAN that cannot be traced to the underlying PAN except by a token service provider; one or more embodiments use Payment Tokens as defined in the aforementioned EMV® Payment Tokenisation Specification Technical Framework, Version 1.0.

Some embodiments, in the characterizing step, take into account that cardholders in a certain one of the token BIN ranges who have electronic devices on which tokenization has taken place are likely to have a lower credit risk than a general population. Furthermore in this regard, on the one hand, if segmenting within a BIN range by token or PAN, this to some extent defeats the purpose of a BIN range, since now the focus is on individuals instead of the BIN range as a whole. On the other hand, one or more embodiments are self-segmenting, since when someone presents the tokenized phone it is known that he or she already falls within that sub-group of the BIN. Thus, in one aspect, a BIN with a 550 FICO score may have a 60% chance of paying but those in the BIN who have e-wallets on their phones are more technically savvy and with research it may be possible to show that they have a 70% chance of paying. In this approach, look at 70% and not 60% when deciding whether that BIN range is good, since in some embodiments, this solution inherently is only available to people using an e-wallet. On the other hand, if looking solely at token BIN ranges, everyone inherently has a token and thus a smart phone. However, in this aspect, a "plus up" option can be provided for those that are more technically savvy—for a token BIN range the "plus up" could be frequency. Just because someone owns something does not mean that they are comfortable using it; the enhanced score for the technically savvy (e.g., bump from 60% to 70%) may be reserved for those who frequently use e-wallets as opposed to just owning a smart phone. Thus, sub-segmenting the BIN may lead to some issues but it can advantageously provide another data point that can help the transit authority make a GO-NO GO decision.

Figure 13:
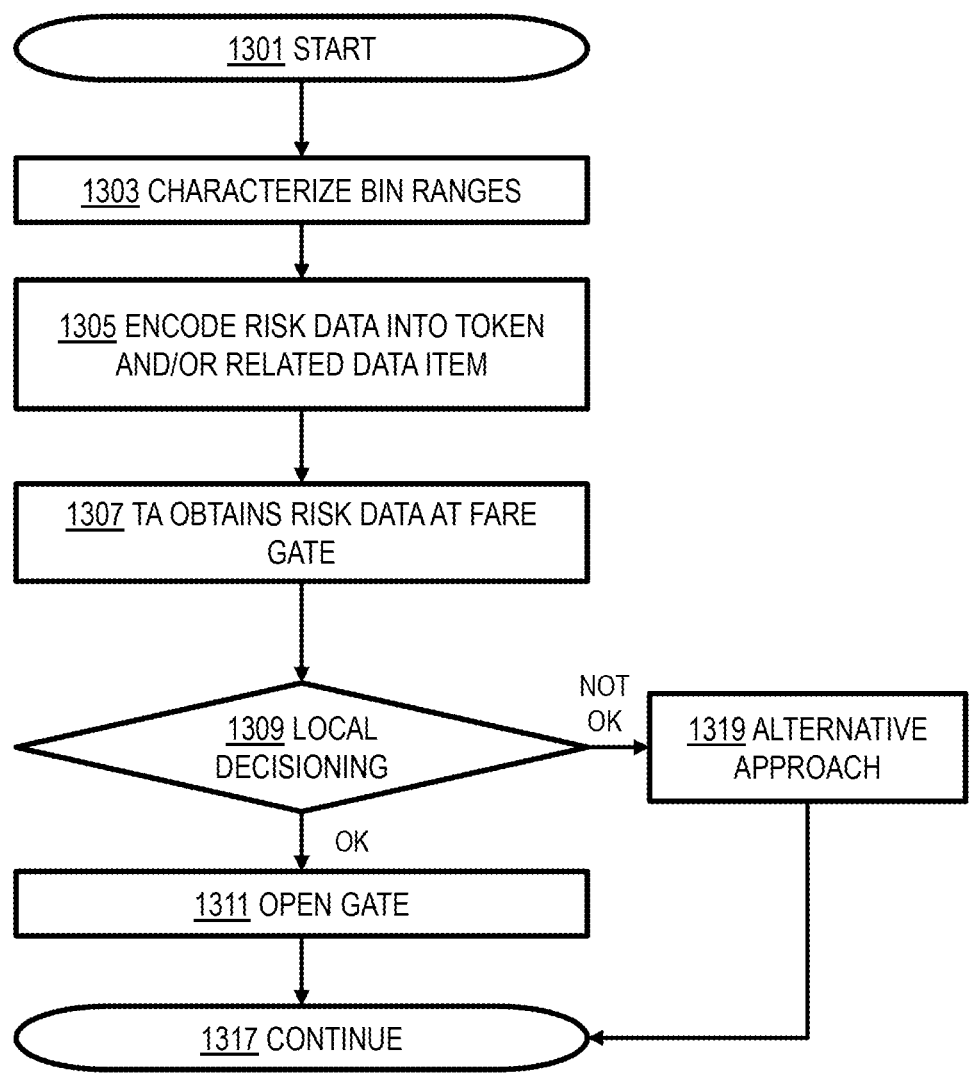
FIG. 13 is a flow chart of another exemplary method according to another aspect of the present disclosure.

Furthermore, given the discussion thus far, and with reference to the flow chart of FIG. 13 which begins at 1301, it will be appreciated that, in general terms, another exemplary method, according to another aspect of the invention, includes the steps of 1303, characterizing a plurality of token BIN ranges according to credit risk; and 1305, encoding, in at least one of: (i) corresponding tokens; and (ii) data items related to the corresponding tokens, data indicative of the credit risk. These steps can be implemented, for example, by an operator of a payment card network, working in conjunction with one or more issuers and interfacing with a transit agency. The payment card network operator may also act as a token service provider or work with a token service provider to instantiate the tokens (with related data items when used).

In some cases, for example, BIN ranges such as token BIN ranges are scored on a scale of 1-10 and the score is encoded in the token or a data items related to the token on the card or phone. The turnstile has (configurable) logic that a score above a certain level gets access while one below the certain level does not; e.g., greater than or equal to seven, access, else not.

In some embodiments, the data indicative of the credit risk includes a GO-NO GO indicator for each of the token BIN ranges. In some cases, the characterizing step includes breaking the credit risk into predetermined percentiles and designating percentiles above a certain score as GO and percentiles below a certain score as NO GO.

In some embodiments, the data indicative of the credit risk includes a score for each of the token BIN ranges. Some instances, in the characterizing step, take into account that cardholders in a certain one of the token BIN ranges who have electronic devices on which tokenization has taken place are likely to have a lower credit risk than a general population. Refer to above discussions re sub-segmenting the BIN.

Even further, given the discussion thus far, and referring again to the flow chart of FIG. 12, it will be appreciated that, in general terms, yet another exemplary method, according to yet another aspect of the invention, includes step 1207, obtaining, at a transit-specific payment network interface processor 795 coupled to a plurality of memory-constrained fare gates 702 of a transit authority, from another party (e.g., a payment card network operator or entity acting on their behalf), a list of a plurality of BIN ranges characterized by credit risk. Also included are step 1209, distributing the list to the memory-constrained fare gates of the transit authority (e.g., to 7020); and step 1211, obtaining, by the transit authority, from a prospective passenger, at a given one of the memory-constrained fare gates, an indication of a BIN range (e.g., BIN or data that BIN can be locally determined from). An even further step 1213 includes making a real-time access decision for the prospective passenger based on looking up the BIN range in the list 7020. This can be done locally at the turnstile in conformance to time constraints; e.g., in less than 500 msec, and without waiting for the result of an ISO 8583 auth request and auth request response 0100/0110 or the like.

If decisioning indicates access is warranted, proceed to step 1215 and open the gate. If not, pursue an alternative approach in step 1219; e.g., route the passenger to a manned station. Processing continues at 1217.

In some instances, making the decision includes checking the list for a GO-NO GO indicator corresponding to the BIN range.

In some embodiments, making the decision includes checking the list for a credit risk score corresponding to the token BIN range and determining whether the credit risk score is sufficiently positive to warrant the access.

In some cases, the BIN ranges include token BIN ranges.

In some instances an updated list of the plurality of BIN ranges characterized by credit risk is obtained from the other party, based on a periodic re-characterization by the other party. The updated list may be obtained directly or indirectly, and the updated list may not have all the same numbers. In this regard, the token BIN ranges will typically not change once a program has been set up; however, new ones could be added to the list as time goes on.

In some cases, in the obtaining step, the transit-specific payment network interface processor is controlled by an acquirer of the transit authority.

In one or more embodiments, the obtaining of the list includes accessing an application program interface to a centralized data warehouse of a payment card network operator, wherein the list resides, by the transit-specific payment network interface processor.

Still further, given the discussion thus far, and referring again to the flow chart of FIG. 13, it will be appreciated that, in general terms, still another exemplary method, according to still another aspect of the invention, includes step 1307, obtaining, by a transit authority, from a prospective passenger, an electronic token (e.g., presented to the reader of turnstile 702), wherein at least one of the electronic token and a data item related to the electronic token and obtained therewith, includes data, from another party (e.g., a payment card network operator or an entity acting on their behalf), indicative of a credit risk of a token BIN range corresponding to the electronic token. A further step 1309 includes making a real-time access decision for the prospective passenger based on the data indicative of the credit risk of the token BIN range corresponding to the electronic token. This can be done (e.g., by the transit authority) locally at the turnstile in conformance to time constraints; e.g., in less than 500 msec, and without waiting for the result of an ISO 8583 auth request and auth request response 0100/0110 or the like.

If decisioning indicates access is warranted, proceed to step 1311 and open the gate. If not, pursue an alternative approach in step 1319; e.g., route the passenger to a manned station. Processing continues at 1317.

In some cases, the data indicative of the credit risk includes a GO-NO GO indicator for the token BIN range.

In some instances, the data indicative of the credit risk includes a credit risk score for the token BIN range, and a further step includes determining whether the credit risk score is sufficiently positive to warrant the access.

Figure 14:
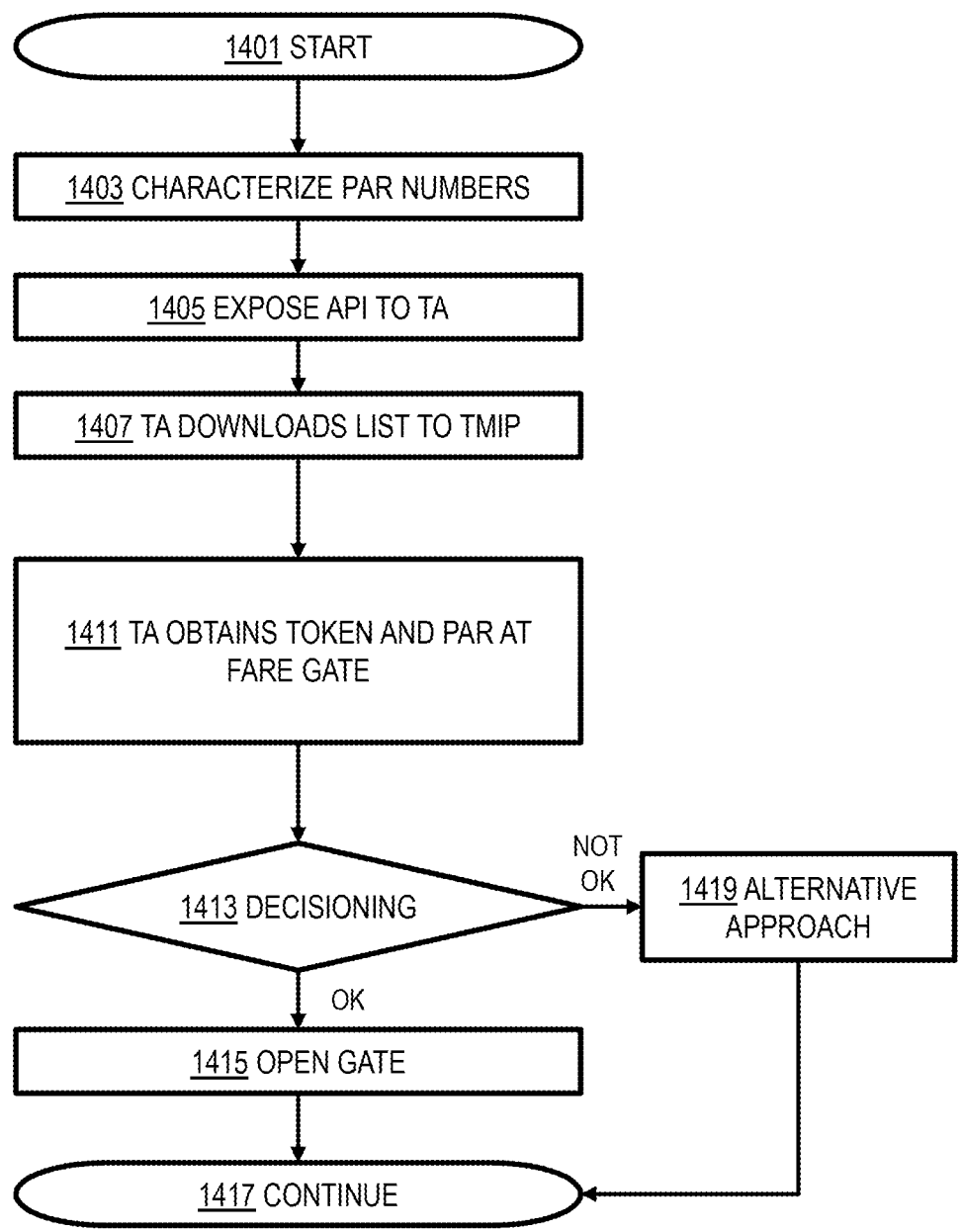
FIG. 14 is a flow chart of still another exemplary method according to still another aspect of the present disclosure.

Even further, given the discussion thus far, and referring now to the flow chart of FIG. 14, which begins at 1401, it will be appreciated that, in general terms, an even further exemplary method, according to an even further aspect of the invention, includes step 1407, obtaining, at a transit-specific payment network interface processor 795 coupled to a plurality of fare gates 702 of a transit authority, from another party (e.g., a payment card network operator or an entity acting on their behalf), a list of a plurality of payment account reference (PAR) numbers characterized by credit risk. A further step 1411 includes obtaining, by the transit authority, from a prospective passenger, at a given one of the fare gates 702, an electronic token and a corresponding given one of the plurality of PAR numbers, without an underlying PAN, and wherein the electronic token and the given one of the plurality of PAR numbers cannot be linked to the underlying PAN by the transit authority. An even further step 1413 includes making a real-time access decision for the prospective passenger based on looking up the PAR in the list. This can be done in conformance to time constraints; e.g., in less than 500 msec, and without waiting for the result of an ISO 8583 auth request and auth request response 0100/0110 or the like. The list could be, for example, a GO, a NO-GO, or a list with a score where a decision is made based on percent or other scoring, or the like. If the list cannot be stored on the fare gate, a high-speed data connection to a TMIP or the like can be employed with the list stored at 7016.

If decisioning indicates access is warranted, proceed to step 1415 and open the gate. If not, pursue an alternative approach in step 1419; e.g., route the passenger to a manned station. Processing continues at 1417.

As part of the method just described, or as a stand-alone method, further steps can include 1403, characterizing a plurality of payment account reference numbers according to credit risk to create the list; and 1405, making available (e.g., by API), to the transit-specific payment network interface processor, the list.

A PAR or truncated PAN pass-back can be useful to keep track of a passenger's journey history when tokenization is employed.

Consider that a transit authority might put a dual interface M/Chip Advance chip on its private label card. Suppose that part of the authority's portfolio is a private label card. The authority might force people to go to the ticket vending machine every certain number of tries (e.g., 10 or other appropriate pre-determined number). They could utilize risk parameters and scoring. The authority may provide a card usable in the transit system that has an open loop portion. For example, there might be a hybrid card with a transit-specific purse and a generally loadable prepaid option usable in the general-purpose payment card infrastructure. This implies that the cardholder must go through the "know your customer" (KYC) process and any other applicable laws and regulations in particular jurisdictions. This results in a hybrid card. In such a case, the transit vendor may not have access to the general payment card infrastructure transactions, only the transactions with the transit specific purse. The payment card network operator, acquirer, and issuer would be the parties handling the general payment card infrastructure transactions. In this aspect, with such a hybrid card, the general payment card infrastructure side could be scored and the score written into the memory of the card's chip; for example, using integrated data storage on the M/Chip Advance chip. A BIN is scored and the score is loaded as a risk management tool onto one of the unsecured portals of a chip. A periodic read/write back onto the card can be undertaken if the score has changed. This aspect relates to a card-centric approach as opposed to a phone-centric approach, although it could be used with a smart phone with appropriate R/W capabilities. Furthermore in this regard, from a card perspective as opposed to a token perspective, suppose a transit agency employs a hybrid card-say, a dual purse product with a transit side to the card and an open loop generally loadable prepaid side. The generally loadable prepaid side of the card could also be scored and that could be housed on the card itself. Note that many transit agencies employ NXP MiFare® chipsets (registered mark of NXP B.V. EINDHOVEN, NETHERLANDS). One or more embodiments can be used with a variety of chipsets; for example, some embodiments could be employed with Mastercard M/Chip Advance applications.

In addition to the aforementioned methods, aspects also contemplate a non-transitory computer readable medium (or multiple such media) including computer executable instructions which when executed by a computer cause the computer to perform any one, some or all of the aforementioned method steps. Furthermore, in addition to the aforementioned methods, aspects also contemplate a system (or apparatus) including a memory, and at least one processor that is coupled to the memory, and operative to perform any one, some, or all of the aforementioned method steps. Instructions from the aforementioned computer readable medium (or multiple such media) could be loaded into one or more memories to configure one or more processors. The apparatus could be configured, for example, with multiple processors connected by networks (e.g., transit payment network interface processor, networked with a transit host/payment platform with access to data warehouse 2062 via exposed API).

It will be appreciated that one or more embodiments characterize BINs, PARs, or the like by risk utilizing data mining capability efficiently located at a central location 2009 in a payment card processing network. However, decisioning is efficiently carried out close to the entrance point; e.g., at reader 702 based on list 7020 or TMIP 795 based on list 7016 and/or fast connection to 2062 via exposed API bypassing acquirer 793.

System and Article of Manufacture Details

Embodiments of the disclosure can employ hardware and/or hardware and software aspects. Software includes but is not limited to firmware, resident software, microcode, etc. Software might be employed, for example, in connection with one or more of a terminal 122, 124, 125, 126; a reader 132; transit PNIP 795; transit host implementing platform 704; a host, server, and/or processing center 140, 142, 144 (optionally with data warehouse 154) of a merchant, issuer, acquirer, processor, bank, agent, third party, or operator of a payment network 2008; and the like; as well as in connection with elements described in FIGS. 3 and 4. Firmware might be employed, for example, in connection with payment devices such as cards 102, 112, as well as reader 132 or reader of 704.

Figure 8:
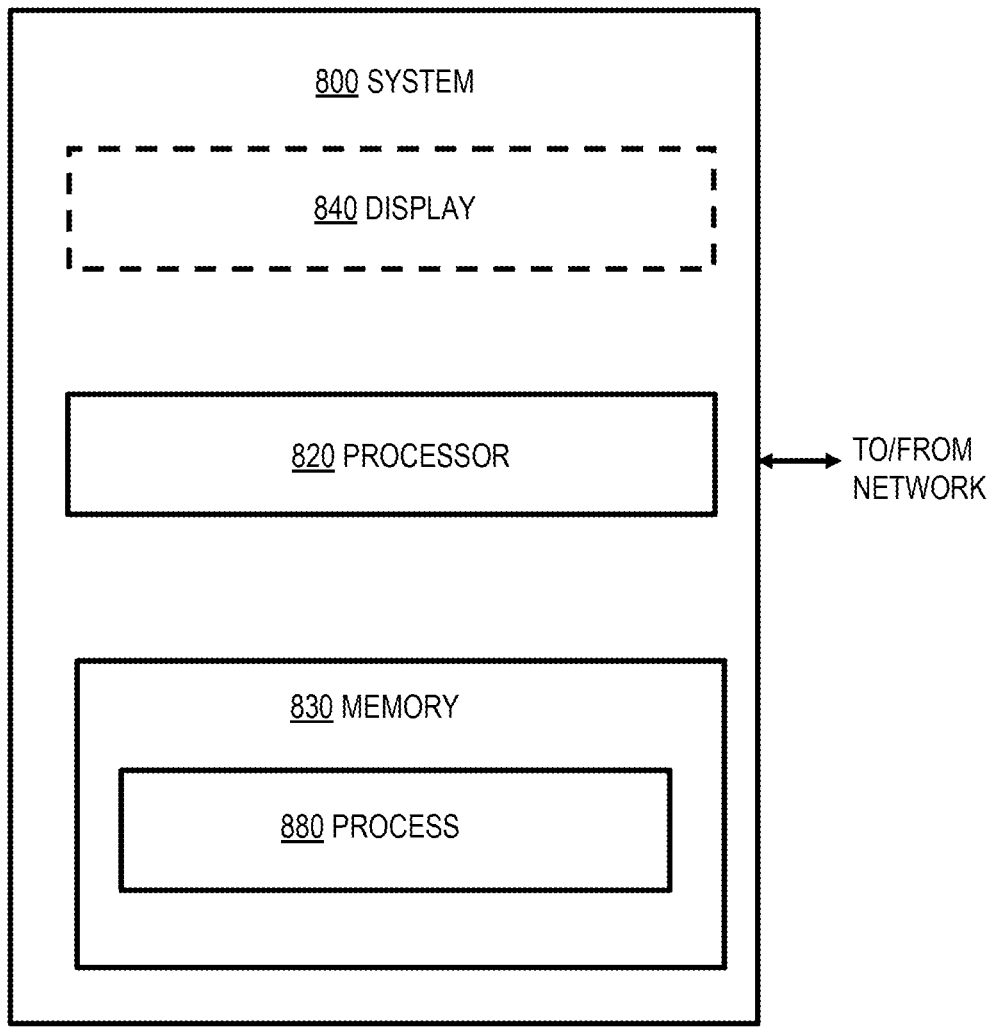
FIG. 8 is a block diagram of an exemplary computer system useful in one or more embodiments of the disclosure.

FIG. 8 is a block diagram of a system 800 that can implement part or all of one or more aspects or processes of the disclosure. As shown in FIG. 8, memory 830 configures the processor 820 (which could correspond, e.g., to processor portions 106, 116, 130; a processor of a terminal or a reader 132; processors of remote hosts in centers 140, 142, 144; processors of hosts and/or servers implementing systems in FIGS. 3, 4, 10, 11 and their components; processors of hosts and/or servers of other parties described herein; and the like); to implement one or more aspects of the methods, steps, and functions disclosed herein (collectively, shown as process 880 in FIG. 8). System 800 is also representative of the computational functionality of a "smart" cellular telephone (which would also include wireless communication functionality in a well-known manner) or of a wearable device. Different method steps can be performed by different processors. The memory 830 could be distributed or local and the processor 820 could be distributed or singular. The memory 830 could be implemented as an electrical, magnetic or optical memory, or any combination of these or other types of storage devices (including memory portions as described above with respect to cards 102, 112). It should be noted that if distributed processors are employed, each distributed processor that makes up processor 820 generally contains its own addressable memory space. It should also be noted that some or all of computer system 800 can be incorporated into an application-specific integrated circuit (ASIC) or general-use integrated circuit. For example, one or more method steps could be implemented in hardware in an ASIC or field-programmable gate array (FPGA) rather than using firmware. Display 840 is representative of a variety of possible input/output devices (e.g., displays, printers, keyboards, mice, touch screens, touch pads, and so on).

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is defined to encompass a recordable medium (non-transitory storage), examples of which are set forth above, but does not encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on one, some, or all of elements 122, 124, 125, 126, 140, 142, 144, 2004, 2006, 2008, 2010, 102, 112, 132, 126, 704, 795, 702; on a computer implementing aspects of systems in FIGS. 3-4 and 10-11 and their components; on processors of hosts and/or servers of other parties described herein; and the like. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the disclosure, such as, for example, 122, 124, 125, 126, 140, 142, 144, 2004, 2006, 2008, 2010, 102, 112, 132, 126, 704, 795, 702; on a computer implementing aspects of systems in FIGS. 3-4 and 10-11 and their components; on processors of hosts and/or servers of other parties described herein; and the like, can make use of computer technology with appropriate instructions to implement method steps described herein. Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the disclosure can include a computer program product comprising computer program code means adapted to perform one or all of the steps of any methods or claims set forth herein when such program is run on a computer, and that such program may be embodied on a computer readable medium. Further, one or more embodiments of the present disclosure can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 800 as shown in FIG. 8) running a server program. It will be understood that such a physical server may or may not include a display, keyboard, or other input/output components. A "host" includes a physical data processing system (for example, system 800 as shown in FIG. 8) running an appropriate program.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures or described herein. Referring again to FIGS. 3-4 and 10-11, in one or more embodiments, the modules include one or more database modules for querying databases, data warehouses, lists 7016/7020, etc., software or firmware modules residing on the card, reader, and terminal as described herein (e.g., for decisioning logic); a module or modules with code to implement one or more APIs (e.g., for transit PNIP 795 to access central facility 2009); analytics software to facilitate characterizing BINs or PARs according to risk (e.g., in central location 2009); and the like. The database modules can include, for example, a (relational, graphical, or other) database management system (DBMS) which provides access to the database via queries and the like. The method steps can, in any event, be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

A user interface module to implement a user interface can include hypertext markup language (HTML) code served out by a server or the like, to a browser of a computing device of a user. The HTML is parsed by the browser on the user's computing device to create a graphical user interface (GUI).

Thus, aspects of the disclosure can be implemented, for example, by one or more appropriately programmed general purpose computers, such as, for example, servers, mobile devices, or personal computers, located at one or more of the entities in the figures, as well as within the payment network 2008. Such computers can be interconnected, for example, by one or more of payment network 2008, another VPN, the Internet, a local area and/or wide area network (LAN and/or WAN), via an EDI layer, and so on. Note that element 2008 represents both the network and its operator. The computers can be programmed, for example, in compiled, interpreted, object-oriented, assembly, and/or machine languages, for example, one or more of C, C++, Java, Visual Basic, COBOL, Assembler, Structured Query Language (SQL), and the like (an exemplary and non-limiting list), and can also make use of, for example, Extensible Markup Language (XML), known application programs such as relational database applications (e.g., IBM DB2® software available from International Business Machines Corporation, Armonk, N.Y., USA; SAS® software available from SAS Institute, Inc., Cary, N.C., USA), spreadsheets (e.g., MICROSOFT EXCEL® software available from Microsoft Corporation, Redmond, Wash., USA), and the like. The computers can be programmed to implement the logic and/or data flow depicted in the figures. In some instances, messaging and the like may be in accordance with the International Organization for Standardization (ISO) Specification 8583 Financial transaction card originated messages—Interchange message specifications and/or the ISO 20022 or UNIFI Standard for Financial Services Messaging, also incorporated herein by reference in its entirety for all purposes.

Although illustrative embodiments of the disclosure have been described herein with reference to the accompanying drawings, it is to be understood that the disclosure is not limited to those precise embodiments, and that various other changes and modifications may be made by one skilled in the art without departing from the scope or spirit of the disclosure.

What is claimed is:

1. A method comprising:

characterizing a plurality of bank identification number (BIN) ranges according to credit risk;

making available, to a transit-specific payment network interface processor coupled to a plurality of memory-constrained fare gates of a transit authority, a list of said plurality of bank identification number (BIN) ranges characterized by credit risk, said list being configured to be distributed to said memory-constrained fare gates of said transit authority;

obtaining, at said transit-specific payment network interface processor coupled to said plurality of memory-constrained fare gates of a transit authority, said list of said plurality of bank identification number (BIN) ranges characterized by credit risk;

distributing said list to said memory-constrained fare gates of said transit authority;

obtaining, by said transit authority, from a prospective passenger, at a given one of said memory-constrained fare gates, an indication of a bank identification number (BIN) range;

sending an authorization request from said memory-constrained fare gate to a payment network interface platform (PNIP); and without waiting for a response to said authorization request, making a real-time access decision at said memory-constrained fare gate and opening said memory-constrained fare gate for said prospective passenger based on looking up said bank identification number (BIN) range in said list;

periodically re-characterizing at least a portion of said plurality of bank identification number (BIN) ranges according to credit risk; and making available, to said transit-specific payment network interface processor, an updated list of said plurality of bank identification number (BIN) ranges characterized by credit risk, based on said periodic re-characterization.

2. The method of claim 1, further comprising generating said list by providing a GO-NO GO indicator for each of said bank identification number (BIN) ranges.

3. The method of claim 2, wherein said characterizing comprises breaking said credit risk into predetermined percentiles and designating percentiles above a certain score as GO and percentiles below a certain score as NO GO.

4. The method of claim 1, further comprising generating said list by providing a score for each of said bank identification number (BIN) ranges.

5. The method of claim 1, wherein, in said step of making said list available, said transit-specific payment network interface processor is controlled by an acquirer of said transit authority.

6. The method of claim 1, wherein said step of making said list available comprises exposing, to said transit-specific payment network interface processor, an application program interface to a centralized data warehouse of a payment card network operator, wherein said list resides.

7. The method of claim 1, wherein said bank identification number (BIN) ranges comprise token BIN ranges.

8. The method of claim 7, further comprising, in said characterizing step, taking into account that cardholders in a certain one of said token BIN ranges who have electronic devices on which tokenization has taken place are likely to have a lower credit risk than a general population.

* * * * *